US012574336B1

(12) United States Patent
Morgan et al.

(10) Patent No.: US 12,574,336 B1
(45) Date of Patent: ***Mar. 10, 2026

(54) ENSURING MODEL CONTEXT PROTOCOL SERVER INTEGRITY FOR ARTIFICIAL INTELLIGENCE AGENTS

(71) Applicant: Airia LLC, Alpharetta, GA (US)

(72) Inventors: Andrew Morgan, Dublin (IE); Rahul Parwani, Atlanta, GA (US)

(73) Assignee: Airia LLC, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/267,465

(22) Filed: Jul. 11, 2025

Related U.S. Application Data

(60) Provisional application No. 63/815,410, filed on May 30, 2025.

(51) Int. Cl.
| | |
|---|---|
| *G06F 15/173* | (2006.01) |
| *G06F 3/04847* | (2022.01) |
| *G06F 21/64* | (2013.01) |
| *H04L 47/78* | (2022.01) |

(52) U.S. Cl.
CPC .......... *H04L 47/78* (2013.01); *G06F 3/04847* (2013.01); *G06F 21/64* (2013.01)

(58) Field of Classification Search
CPC ....... H04L 47/78; G06F 3/04847; G06F 21/64
USPC ........................................................ 709/226
See application file for complete search history.

(56) References Cited

U.S. PATENT DOCUMENTS

| | | | |
|---|---|---|---|
| 10,192,170 B2 | 1/2019 | Bates et al. | |
| 10,389,592 B2 | 8/2019 | Lui et al. | |
| 11,240,128 B2 | 2/2022 | Chitalia et al. | |
| 11,323,327 B1 | 5/2022 | Chitalia et al. | |
| 11,977,471 B2 | 5/2024 | Casati et al. | |
| 12,021,693 B1 | 6/2024 | Chitalia et al. | |
| 12,141,726 B2 | 11/2024 | Cook | |
| 12,242,521 B2 | 3/2025 | Zarokian et al. | |
| 2019/0294779 A1 | 9/2019 | Suneja et al. | |

(Continued)

FOREIGN PATENT DOCUMENTS

| | | |
|---|---|---|
| CN | 120029517 A | 5/2025 |
| CN | 120547240 A | 8/2025 |
| CN | 120560800 A | 8/2025 |

OTHER PUBLICATIONS

Ivo Brett, Simplified and Secure MCP Gateways for Enterprise AI Integration, 2025, Cissp, B .Eng, MSc Solution Architect/Educator independent.academia.edu/ivobrett, pp. 1-4 (Year: 2025).

(Continued)

*Primary Examiner* — Alan S Chou

(74) *Attorney, Agent, or Firm* — Clayton, McKay & Bailey, PC

(57) ABSTRACT

A system detects changes in model context protocol ("MCP") processes, and performs a remedial action. A server-sent events ("SSE") bridge sends a request to an MCP server. A first list of resource profiles, including tools and instructions, is received from the MCP server. This is stored and compared against a later list of tools and instructions. When a difference is detected, a user interface can display the difference to an administrator. Security rules cause the SSE bridge to be blocked from sending commands to the impacts tool or MCP server until approved by the administrator.

20 Claims, 15 Drawing Sheets

(56) References Cited

U.S. PATENT DOCUMENTS

| | | | |
|---|---|---|---|
| 2022/0027178 A1 | 1/2022 | Caldarale et al. | |
| 2025/0005836 A1* | 1/2025 | Chu | G06F 21/107 |
| 2025/0139446 A1 | 5/2025 | Li et al. | |
| 2025/0156828 A1 | 5/2025 | Sliwka et al. | |
| 2025/0190966 A1* | 6/2025 | Gutierrez-Sheris | G06Q 20/02 |
| 2025/0244970 A1* | 7/2025 | Sundaram | G06F 8/35 |
| 2025/0292250 A1 | 9/2025 | Makeig | |

OTHER PUBLICATIONS

Wen et al.; From stdio to HTTP SSE: Host Your MCP Server with APISIX API Gateway; Apr. 21, 2025; The Apache Software Foundation; pp. 1-10. (Year: 2025).

* cited by examiner

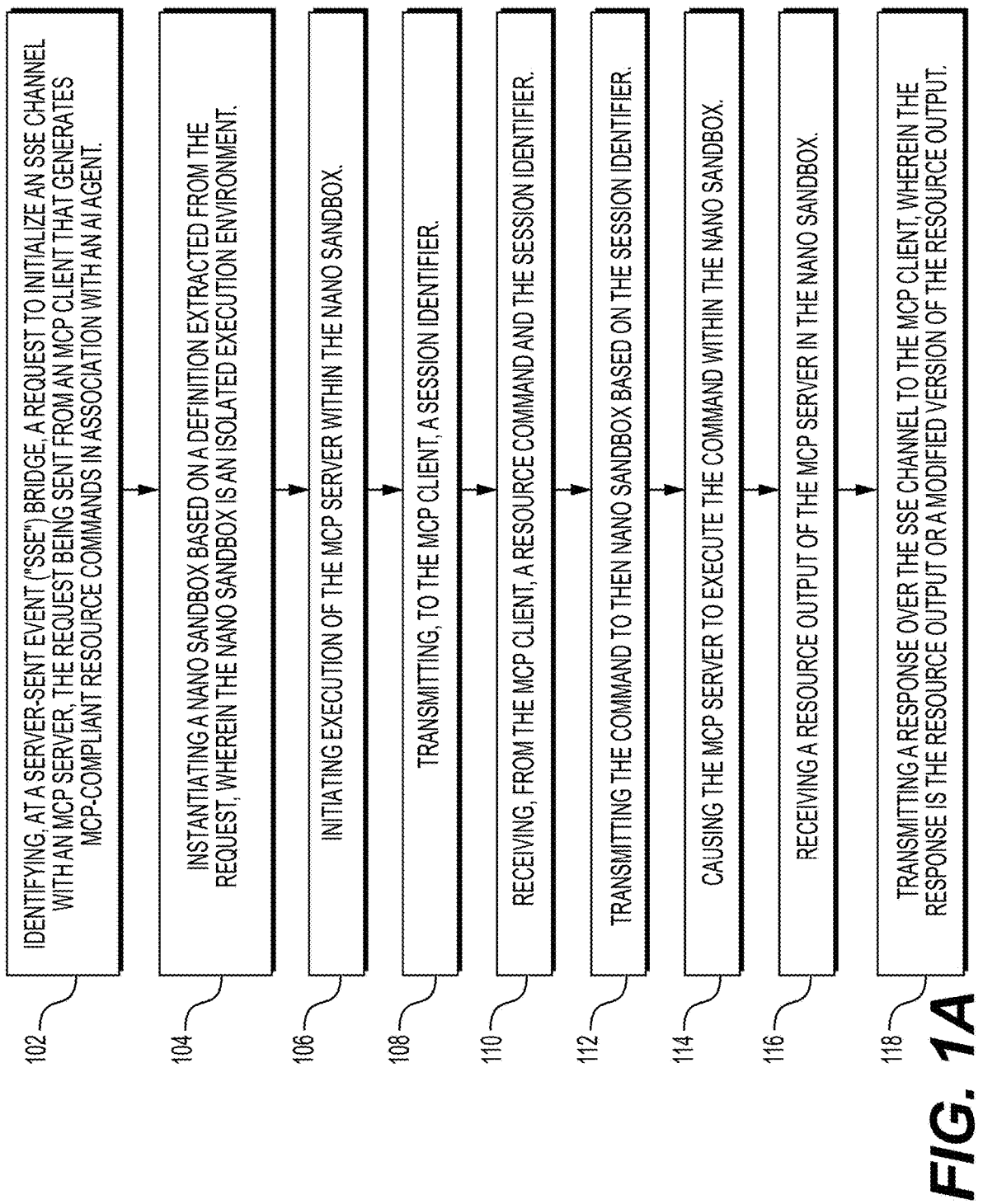

102 — IDENTIFYING, AT A SERVER-SENT EVENT ("SSE") BRIDGE, A REQUEST TO INITIALIZE AN SSE CHANNEL WITH AN MCP SERVER, THE REQUEST BEING SENT FROM AN MCP CLIENT THAT GENERATES MCP-COMPLIANT RESOURCE COMMANDS IN ASSOCIATION WITH AN AI AGENT.

104 — INSTANTIATING A NANO SANDBOX BASED ON A DEFINITION EXTRACTED FROM THE REQUEST, WHEREIN THE NANO SANDBOX IS AN ISOLATED EXECUTION ENVIRONMENT.

106 — INITIATING EXECUTION OF THE MCP SERVER WITHIN THE NANO SANDBOX.

108 — TRANSMITTING, TO THE MCP CLIENT, A SESSION IDENTIFIER.

110 — RECEIVING, FROM THE MCP CLIENT, A RESOURCE COMMAND AND THE SESSION IDENTIFIER.

112 — TRANSMITTING THE COMMAND TO THEN NANO SANDBOX BASED ON THE SESSION IDENTIFIER.

114 — CAUSING THE MCP SERVER TO EXECUTE THE COMMAND WITHIN THE NANO SANDBOX.

116 — RECEIVING A RESOURCE OUTPUT OF THE MCP SERVER IN THE NANO SANDBOX.

118 — TRANSMITTING A RESPONSE OVER THE SSE CHANNEL TO THE MCP CLIENT, WHEREIN THE RESPONSE IS THE RESOURCE OUTPUT OR A MODIFIED VERSION OF THE RESOURCE OUTPUT.

*FIG. 1A*

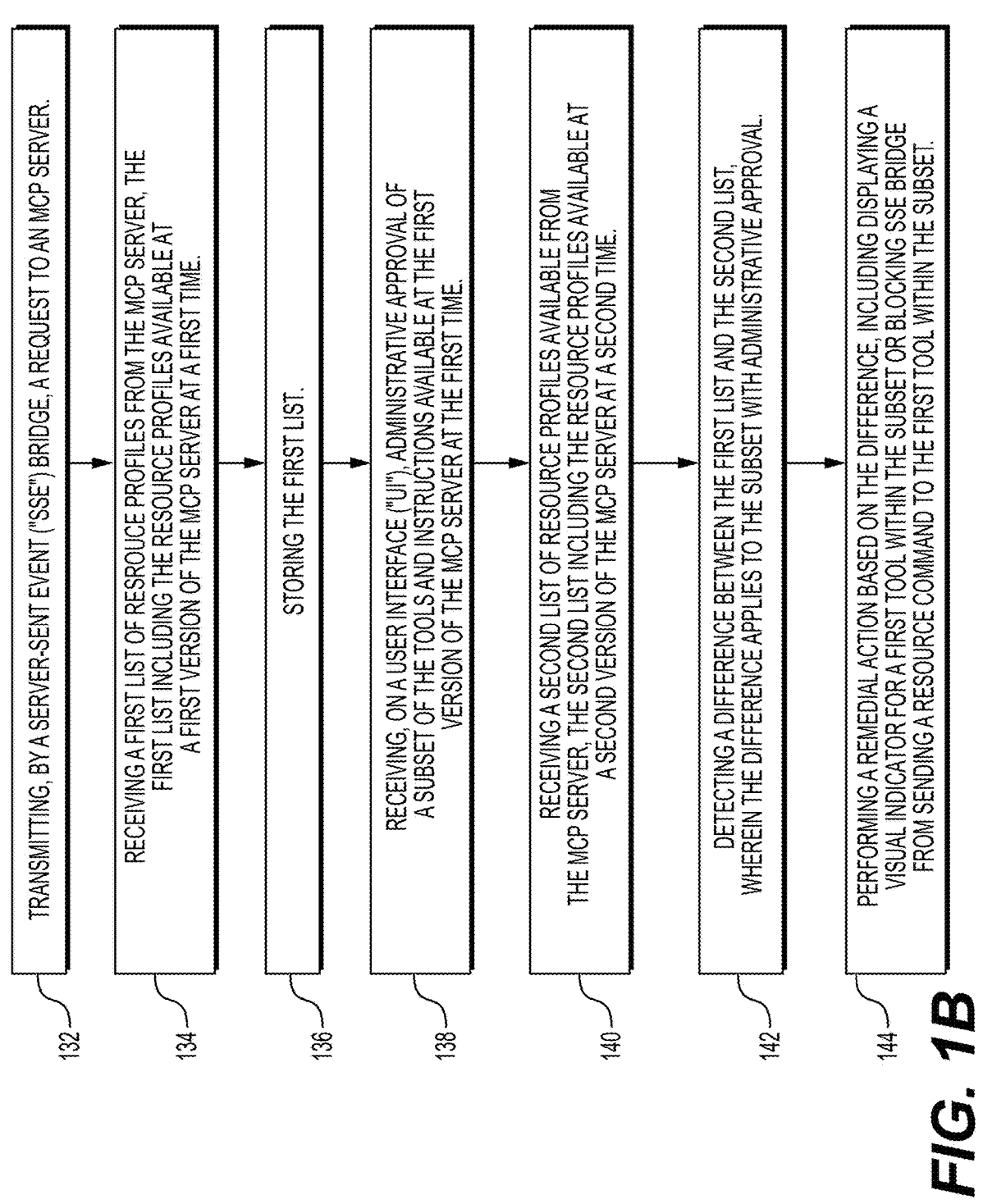

132 — TRANSMITTING, BY A SERVER-SENT EVENT ("SSE") BRIDGE, A REQUEST TO AN MCP SERVER.

134 — RECEIVING A FIRST LIST OF RESROUCE PROFILES FROM THE MCP SERVER, THE FIRST LIST INCLUDING THE RESOURCE PROFILES AVAILABLE AT A FIRST VERSION OF THE MCP SERVER AT A FIRST TIME.

136 — STORING THE FIRST LIST.

138 — RECEIVING, ON A USER INTERFACE ("UI"), ADMINISTRATIVE APPROVAL OF A SUBSET OF THE TOOLS AND INSTRUCTIONS AVAILABLE AT THE FIRST VERSION OF THE MCP SERVER AT THE FIRST TIME.

140 — RECEIVING A SECOND LIST OF RESOURCE PROFILES AVAILABLE FROM THE MCP SERVER, THE SECOND LIST INCLUDING THE RESOURCE PROFILES AVAILABLE AT A SECOND VERSION OF THE MCP SERVER AT A SECOND TIME.

142 — DETECTING A DIFFERENCE BETWEEN THE FIRST LIST AND THE SECOND LIST, WHEREIN THE DIFFERENCE APPLIES TO THE SUBSET WITH ADMINISTRATIVE APPROVAL.

144 — PERFORMING A REMEDIAL ACTION BASED ON THE DIFFERENCE, INCLUDING DISPLAYING A VISUAL INDICATOR FOR A FIRST TOOL WITHIN THE SUBSET OR BLOCKING SSE BRIDGE FROM SENDING A RESOURCE COMMAND TO THE FIRST TOOL WITHIN THE SUBSET.

*FIG. 1B*

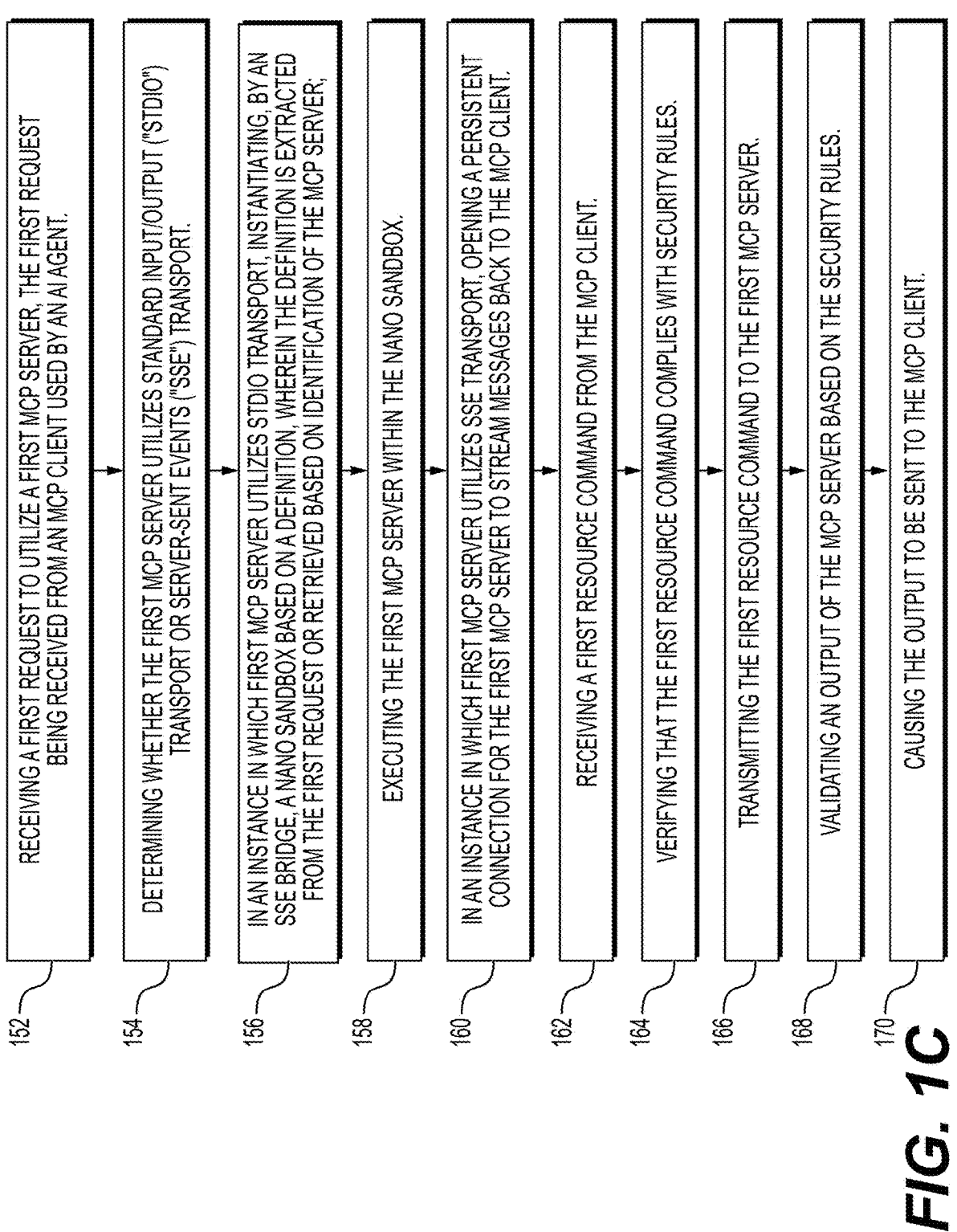

152 — RECEIVING A FIRST REQUEST TO UTILIZE A FIRST MCP SERVER, THE FIRST REQUEST BEING RECEIVED FROM AN MCP CLIENT USED BY AN AI AGENT.

154 — DETERMINING WHETHER THE FIRST MCP SERVER UTILIZES STANDARD INPUT/OUTPUT ("STDIO") TRANSPORT OR SERVER-SENT EVENTS ("SSE") TRANSPORT.

156 — IN AN INSTANCE IN WHICH FIRST MCP SERVER UTILIZES STDIO TRANSPORT, INSTANTIATING, BY AN SSE BRIDGE, A NANO SANDBOX BASED ON A DEFINITION, WHEREIN THE DEFINITION IS EXTRACTED FROM THE FIRST REQUEST OR RETRIEVED BASED ON IDENTIFICATION OF THE MCP SERVER;

158 — EXECUTING THE FIRST MCP SERVER WITHIN THE NANO SANDBOX.

160 — IN AN INSTANCE IN WHICH FIRST MCP SERVER UTILIZES SSE TRANSPORT, OPENING A PERSISTENT CONNECTION FOR THE FIRST MCP SERVER TO STREAM MESSAGES BACK TO THE MCP CLIENT.

162 — RECEIVING A FIRST RESOURCE COMMAND FROM THE MCP CLIENT.

164 — VERIFYING THAT THE FIRST RESOURCE COMMAND COMPLIES WITH SECURITY RULES.

166 — TRANSMITTING THE FIRST RESOURCE COMMAND TO THE FIRST MCP SERVER.

168 — VALIDATING AN OUTPUT OF THE MCP SERVER BASED ON THE SECURITY RULES.

170 — CAUSING THE OUTPUT TO BE SENT TO THE MCP CLIENT.

FIG. 1C

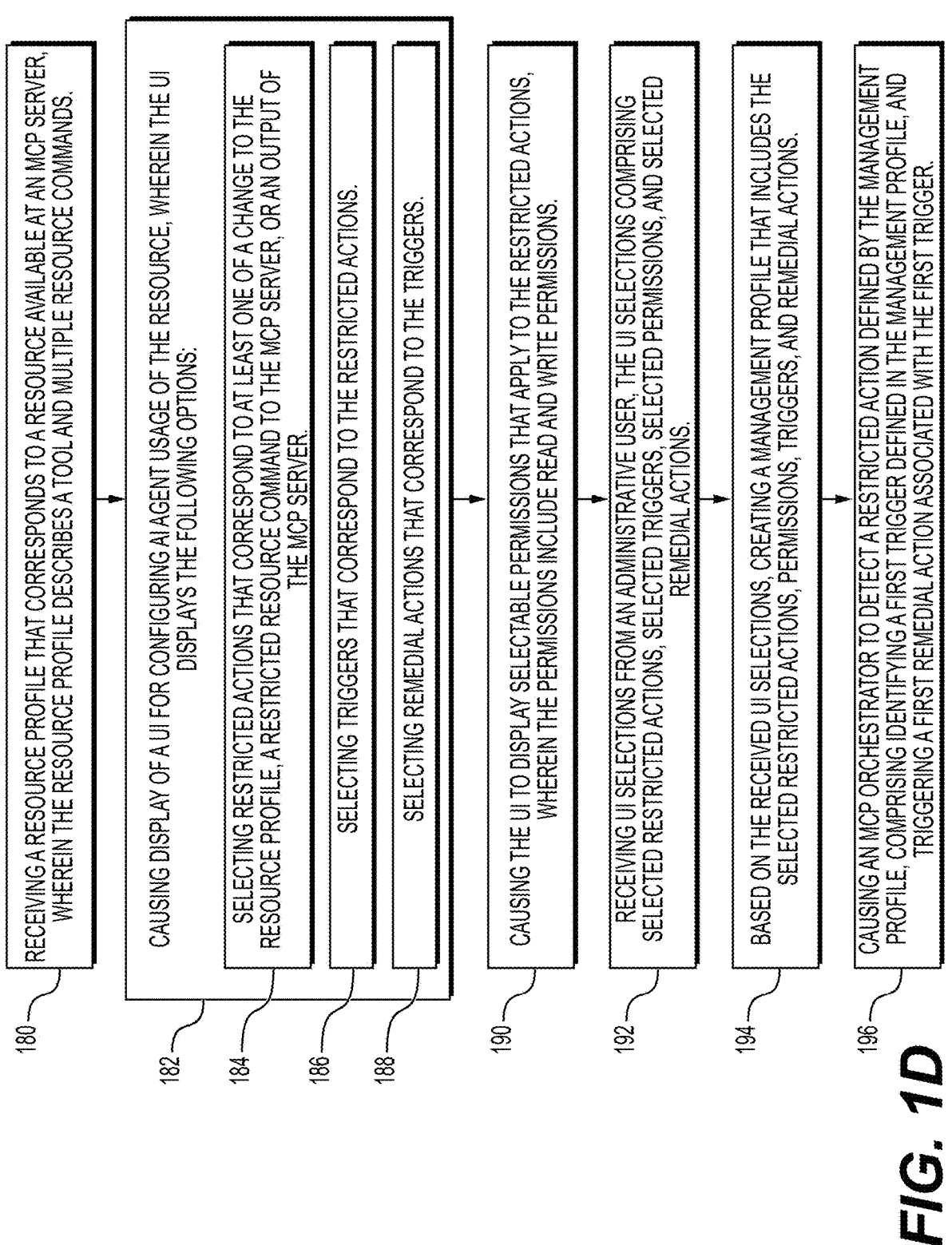

180 — RECEIVING A RESOURCE PROFILE THAT CORRESPONDS TO A RESOURCE AVAILABLE AT AN MCP SERVER, WHEREIN THE RESOURCE PROFILE DESCRIBES A TOOL AND MULTIPLE RESOURCE COMMANDS.

182 — CAUSING DISPLAY OF A UI FOR CONFIGURING AI AGENT USAGE OF THE RESOURCE, WHEREIN THE UI DISPLAYS THE FOLLOWING OPTIONS:

184 — SELECTING RESTRICTED ACTIONS THAT CORRESPOND TO AT LEAST ONE OF A CHANGE TO THE RESOURCE PROFILE, A RESTRICTED RESOURCE COMMAND TO THE MCP SERVER, OR AN OUTPUT OF THE MCP SERVER.

186 — SELECTING TRIGGERS THAT CORRESPOND TO THE RESTRICTED ACTIONS.

188 — SELECTING REMEDIAL ACTIONS THAT CORRESPOND TO THE TRIGGERS.

190 — CAUSING THE UI TO DISPLAY SELECTABLE PERMISSIONS THAT APPLY TO THE RESTRICTED ACTIONS, WHEREIN THE PERMISSIONS INCLUDE READ AND WRITE PERMISSIONS.

192 — RECEIVING UI SELECTIONS FROM AN ADMINISTRATIVE USER, THE UI SELECTIONS COMPRISING SELECTED RESTRICTED ACTIONS, SELECTED TRIGGERS, SELECTED PERMISSIONS, AND SELECTED REMEDIAL ACTIONS.

194 — BASED ON THE RECEIVED UI SELECTIONS, CREATING A MANAGEMENT PROFILE THAT INCLUDES THE SELECTED RESTRICTED ACTIONS, PERMISSIONS, TRIGGERS, AND REMEDIAL ACTIONS.

196 — CAUSING AN MCP ORCHESTRATOR TO DETECT A RESTRICTED ACTION DEFINED BY THE MANAGEMENT PROFILE, COMPRISING IDENTIFYING A FIRST TRIGGER DEFINED IN THE MANAGEMENT PROFILE, AND TRIGGERING A FIRST REMEDIAL ACTION ASSOCIATED WITH THE FIRST TRIGGER.

FIG. 1D

ENSURING MODEL CONTEXT PROTOCOL SERVER INTEGRITY FOR ARTIFICIAL INTELLIGENCE AGENTS

CROSS REFERENCE TO RELATED APPLICATIONS

This application claims priority as a non-provisional application to U.S. provisional application No. 63/815,410, titled "Secure Model Context Protocol Server Access for Artificial Intelligence Agents," filed on May 30, 2025, the contents of which are incorporated herein in their entirety.

BACKGROUND

Model Context Protocol ("MCP") is a protocol for managing and coordinating interactions between Artificial intelligence ("AI") agents, large language models ("LLMs"), and tools. An AI model or AI agent can use standard message formats to connect to an MCP server, which gives access to various tools. The MCP server can read and write using standard input/output ("STDIO"). One purpose of STDIO is to avoid the need for open ports, which reduces attack possibilities and simplifies deployments. STDIO is a process that runs locally, allowing the AI agent or LLM to access tools and other AI agents through the MCP server. The AI agent or LLM can receive a list of available resources from the MCP server and then decide which resources to utilize.

While MCP unlocks powerful AI model capabilities, it introduces critical security risks. Malicious actors can inject harmful tools or modify existing ones (e.g., replacing a "file reader" with malware). MCP servers handling sensitive context/tools may inadvertently expose personal identifying information ("PII") or proprietary data. Additionally, weak authentication can allow attackers to force LLMs to execute unintended tools (e.g., deleting files). Dependency risks also exist, since community-hosted MCP servers may disappear ("rug pull") or push untested updates, disrupting workflows. Unencrypted HTTP streaming or misconfigured SSE channels can expose traffic to MITM attacks.

A subprocess that communicates over STDIO on a local machine is generally safer than exposing network ports, but it is not free of risks. A malicious subprocess can read environment variables, access files, and potentially change privileges. It can also send malicious outputs. Additionally, user inputs into the subprocess's STDIN can open up risks of command injection.

An AI platform or a customer of that platform (e.g., an enterprise) cannot currently ensure that the MCP process remains limited to resources and commands that are safe from a data security perspective. The MCP process could potentially be changed, without knowledge of the user or AI platform, to redirect requests and access resources on the local machine or in the enterprise's private network. When a change goes unnoticed, the security risks can include manipulation of system resources, root access, changing of user privileges and the like. Without creative security measures, the MCP server might access system resources or other private resources of the AI platform. Parent processes and even data of other customers could become available. Likewise, an MCP process could alter libraries or tools that are then used by other AI agents or customers.

Current systems lack a robust solution for preventing STDIO from accessing and manipulating private system resources, changing of user privileges and the like. Additionally, no solution exists for monitoring changes to STDIO in anticipation of these risks.

As a result, new systems and methods are needed for securely executing STDIO for using MCP servers with LLMs and managed AI agents.

SUMMARY

Examples described herein include systems and methods that allow AI agents to interact securely with MCP servers. A system detects changes in model context protocol ("MCP") processes, and performs a remedial action. A server-sent events ("SSE") bridge sends a request to an MCP server. A first list of resource profiles, including tools and instructions, is received from the MCP server. This is stored and compared against a later list of tools and instructions. When a difference is detected, a user interface can display the difference to an administrator. Security rules cause the SSE bridge to be blocked from sending commands to the impacts tool or MCP server until approved by the administrator.

The system can address unauthorized tool execution by providing tool-level authorization. An administrator can review and allow specific tools available at an MCP server. Additionally, the system can enforce the MCP server's definitions of tools by preventing changes at runtime for STDIO servers.

Similarly, the system can prevent tool poisoning and rug pull attacks. This is accomplished with a tool change comparison in the user interface. The user interface visually differentiates tool versions and checksums and alerts administrators to unauthorized modifications.

The user interface can allow for applying guardrails, such as prompt injection detection, to tool definitions. This can cause the gateway to apply management policies to inputs (e.g., resource commands) to and outputs from the nano sandbox. The guardrails themselves can be additional tools. In this way, a tool definition can invoke additional tools as security measures. The system also provides a technical solution to dependency risks by automatically blocking MCP servers if tools or MCP server definitions change without approval. This can include changes in IP Address, URLs, or other endpoint identifiers or credentials in addition to tool changes.

The AI platform can create a nano sandbox in which MCP STDIO processes execute. The nano sandbox is an MCP container that isolates an MCP server execution. An SSE serves as a bridge between clients and processes using JSON-RPC commands via standard input/output streams into and out of the nano sandbox. The nano sandbox can allow a user to run MCP STDIO processes in a controlled environment. The MCP server can reach out to third-party services from within the nano sandbox but is limited to the system resources provisioned within the nano sandbox. The nano sandbox can operate with an MCP Inspector and other tools that benefit from a nano sandboxed environment. The system can allow a header-configurable, auto-scaling nano sandbox that can operate in two modes. The nano sandbox can be accessed with a JSON-RPC over STDIO interface and an HTTP/SSE based client interaction model.

In general, the AI platform can provide secure, on-demand MCP server access for customers. To do this the AI platform can utilize ephemeral containers, deploying STDIO MCP servers in isolated, short-lived nano sandbox environments per customer transaction. Servers can be spun up dynamically and terminated immediately after task completion. This can ensure zero data retention and eliminate persistent attack surfaces. The AI platform's containerization framework can be leveraged to manage authentication, resource allocation, and lifecycle automation. This is ideal for customers prioritizing convenience, security, and compliance (e.g., regulated industries). The system can also utilize nano sandboxes for customer-hosted MCP servers. This can be ideal for enterprises with more mature development and security in place, who are seeking custom toolchains.

To accommodate these needs, the nano sandbox can operate in two modes. In a one-to-one mode, a single nano sandbox is created for each request. Each client request triggers the creation of a single nano sandbox instance. The nano sandbox is dedicated to processing that specific request. For communications in one-to-one mode, the client sends a JSON-RPC command to the SSE Bridge. The SSE Bridge forwards the command to a newly created nano sandbox. The nano sandbox transmits the command to the process via Standard Input (STDIN). The process executes the command and returns results via Standard Output (STD-OUT). The command can be executed by a process in the nano sandbox, which can be self-contained or make one or more calls to outside providers. The nano sandbox captures the output and relays it back to the SSE Bridge. The SSE Bridge then delivers the response to the Client. Upon completion, the container terminates. Kubernetes can manage the lifecycle through automatic restarts. The container terminates when the processes end.

One-to-one mode provides a simple architecture with direct request-to-nano sandbox mapping. There is a clean isolation between different client requests, with automatic cleanup through container termination. This mode can leverage Kubernetes for orchestration and reliability. This mode is particularly suitable for short-lived, stateless operations where process isolation is important and the overhead of creating new containers is acceptable.

The second option is standard mode, which is a persistent connection approach where a nano sandbox is created and maintained for ongoing interactions. This enables multiple message exchanges over a single established session. A client can connect using server-sent events ("SSE"), with the SSE protocol promoting the long-lived connections. The client can hook SSE. The client's Get request to the SSE controller can include a nano sandbox definition in an HTTP header. The definition can identify credentials and resources for use in the nano sandbox. The client request causes the AI platform to create and populate the nano sandbox according to the header. The client can associate the nano sandbox with a message ID. JSON-RPC commands can be sent to the nano sandbox. Responses can be received through the SSE channel. Message IDs can correlate requests with responses. Persistent processes can handle multiple commands. Then manual cleanup occurs when the connections close.

The creation process in standard mode includes a client initiating a GET request to the SSE endpoint with a nano sandbox definition in the headers. The SSE bridge creates the nano sandbox based on the definition and then starts the specified process within the nano sandbox. The SSE bridge then pings the nano sandbox until it is ready, using a timeout mechanism. The SSE bridge assigns and returns a unique message ID to the client. The client then sends commands via POST to a folder with the message ID (e.g., /message/ {messageID}) with JSON-RPC payloads. The nano sandbox processes the commands and generates responses. The responses are streamed back to the client through the established SSE channel.

The deletion process flow occurs when the client closes the SSE connection. The SSE bridge sends a kill signal to the running process. The SSE bridge disposes of the nano sandbox resources and removes the session from its registry. The SSE bridge the removes the nano sandbox instance from memory.

The system can provide secure, on-demand MCP servers for customers using the AI platform or an associated gateway. The system can utilize ephemeral containers to deploy STDIO MCP servers in isolated, short-lived nano sandbox environments per customer transaction. This can be referred to as a "one-to-one" mode. Servers can be instantiated dynamically and terminated immediately after task completion. The gateway can likewise provide streaming access to a nano sandboxed MCP server.

The gateway can support customers opting for third-party remote MCP servers with guardrails, allowing MCP server integration with SSE or HTTP streaming. The system can monitor changes in the MCP server, flagging IP or DNS changes, tool list modifications, or unexpected behavior in real time.

The nano sandbox acts as an MCP container with enhanced security. The nano sandbox can be a short-lived, isolated container environment that ensures authentication credentials and sensitive data do not persist. The nano sandbox can be defined to use limited OS features, like Linux namespaces, chroot, macOS nano sandbox-exec, or Windows low integrity level. For example, the nano sandbox can be instantiated with a Linux bubblewrap command. When a customer session ends, the gateway can automatically purge logs, tools, and artifacts post-transaction to meet GDPR/CCPA requirements.

The tool change comparison features can mitigate against tool poisoning and rug pull attacks. The AI platform and/or gateway can provide a console with a user interface ("UI") to compare tool versions, descriptions, and checksums across MCP server updates. The system can alert administrative users to unauthorized changes, such as malicious code injections and sudden removals.

The UI allows tool-level authorization. An administrator can review and allow specific tools returned from an MCP server, such as by toggling an option to active or inactive by each tool. Additionally, the system can include security policies that can prevent MCP server access when definitions of tools change at runtime for STDIO servers. To detect changes, the AI platform can subscribe to MCP server change events. A list of resource profiles (e.g., tool or dataset specifications or schemas), including a resource identifier (e.g., a unique tool identifier) and a description of the resource, can be requested by the SSE bridge and then compared against a stored prior list. The list can comprise one or more resource profiles.

Additionally, the gateway can apply guardrails, such as prompt injection detection, to tool definitions. Policy enforcement can be automated. For example, the gateway can block MCP server usage if critical changes are detected, such as new tool signatures. The system can be configured to notify an administrative user and require re-validation prior to accessing a specific tool or the MCP server. Additionally, the system can be configured to auto-trust whitelisted tools, definitions, and other potential updates.

The gateway can act as a proxy for communications to an MCP server. This can help customers by centralizing visibility of MCP client server interactions. The gateway can audit all on-behalf-of operations and provide a central point where security solutions can observe and respond to potential attacks.

Additionally, the gateway can sanitize inputs passed to the nano sandbox. This can include setting resource limits for memory, CPU, and runtimes. The gateway can monitor for hangs and excessive I/O and refuse to pass secrets to environment variables unless the MCP subprocess is fully trusted.

The gateway can operate in either a one-to-one mode or can provide a persistent SSE communication channel. Traditional FaaS (functions-as-a-service) handle single request/response cycles rather than long-lived SSE streams. The use of HTTP headers to define and convey nano sandbox configuration (such as selecting the runtime type, resource limits, or other nano sandbox settings) allows for customer flexibility in MCP usage. This provides a lightweight, client-driven way to configure execution environments on the fly, streamlining multi-tenant support in a potentially stateless manner (since a request carries its configuration). This approach is distinct from hardcoded server configs or separate setup calls used in existing solutions.

The system also advantageously automates nano sandbox lifecycle based on the state of the SSE connection and message flow. This includes creating a nano sandbox when an MCP client connects and terminating the nano sandbox when the SSE stream is closed or idle.

Additionally, using JSON-RPC over STDIO means the nano sandboxed process does not need to directly handle network sockets. Instead, the SSE bridge isolates the process from the internet. This reduces the attack surface (e.g., the MCP process cannot be directly accessed except through controlled JSON inputs/outputs). The controlled execution using STDIO pipes coupled with a web streaming interface isolates execution and prevents unauthorized network access by the child process. Similarly, the two-tier model can allow an intermediate layer to enforce access control, authentication, or filtering of messages (e.g., validating headers and JSON-RPC payloads before they reach the nano sandbox).

The combination of a header-configurable, auto-scaling container nano sandbox system with a JSON-RPC over STDIO interface and an HTTP/SSE based client interaction model can provide much-needed security in MCP interactions. This solves the technical problems of safe execution of MCP servers, real-time client alerts regarding changes to MCP servers, with flexible modes for safely connecting to different types of MCP servers.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a hardware-based processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 1A is a flowchart of an example method for securely executing MCP processes in a nano sandbox.

FIG. 1B is a flowchart of an example method for detecting changes in a resource profile of an MCP server enforcing and remedial actions.

FIG. 1C is a flowchart of an example method for providing a gateway for secure MCP server access.

FIG. 1D is a flowchart of an example method for securely executing artificial AI agents based on UI selections of administrator-defined restrictions to MCP servers.

DESCRIPTION OF THE EXAMPLES

Figure 2:
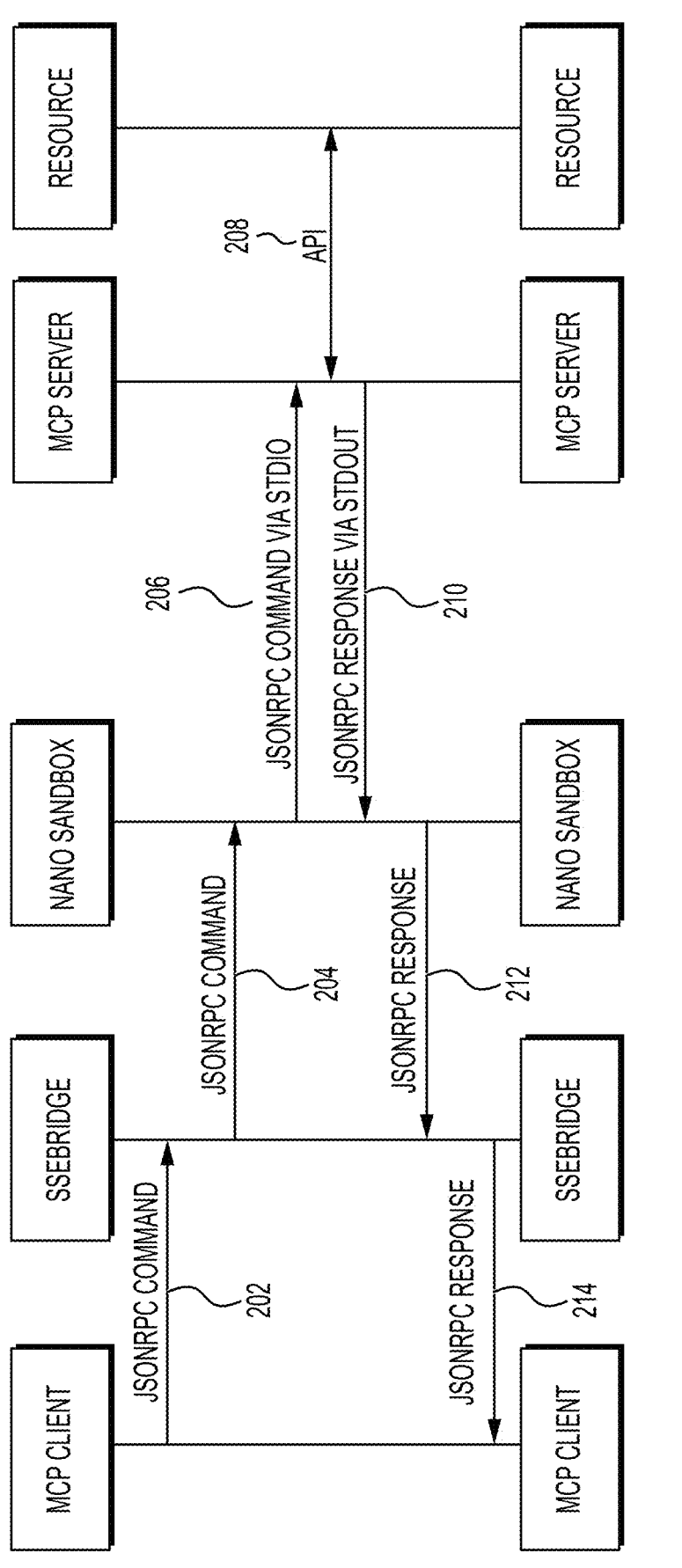
FIG. 2 is a sequence diagram of an example method for a one-to-one operation mode of an ephemerally nano sandboxed MCP process.

Reference will now be made in detail to the present examples, including examples illustrated in the accompanying drawings. Wherever possible, the same reference numbers will be used throughout the drawings to refer to the same or like parts.

FIG. 1B and FIGS. 7A, 7B, and 11 relate to automated UI alerts and associated remedial actions that safeguard AI agent usage of MCP servers.

AI Agents are a configurable software system that performs tasks using artificial intelligence components to achieve specific goals. These agents can be backend-focused "AI Pipelines" processing data without user interaction, or user-facing "AI Assistants" providing conversational interfaces. AI Agents integrate various components (i.e., agent objects) including AI Models, Integrators, Data Sources, Tools, Prompts, Code Blocks, Datasets, Routers, Memory Objects, and others according to defined workflows and rules specified in their "Manifest Files."

An AI platform can allow users to create, modify, and deploy AI agents for execution. The AI agent can attempt to access various tools that can access user accounts. This can require user authentication. Many such tools are accessed through interaction with MCP processes. The AI agent can utilize an MCP client for communicating with the MCP process.

An MCP process can be an MCP server or a one-shot task, such as running code of a tool. Either type of MCP process can run in a standard "streaming" mode where a nano sandbox is created that persists after one command, or in a one-to-one ephemeral container that is terminated after an output is received for the single command. The stages can be performed by an AI platform or a gateway server associated with the platform.

MCP helps build AI agents and complex workflows on top of LLMs. LLMs frequently need to integrate with data and tools, and MCP provides a growing list of pre-built integrations that an LLM can directly plug into and the flexibility to switch between LLM providers and vendors.

MCP clients are protocol clients that typically maintain one-to-one connections with servers. MCP Servers are lightweight programs that expose specific capabilities through the standardized Model Context Protocol. Local Data Sources can include a user's computer files, databases, and services that MCP servers can securely access. Remote Services are external systems available over the internet (e.g., through APIs) that MCP servers can connect to.

An MCP client can communicate with the gateway or AI platform for purposes of executing an MCP process. The MCP client can execute remotely from the gateway and can be an AI agent, frontend interface (potentially user-facing), or orchestrator, that sends commands to MCP servers and handles their responses. The MCP client can interact with the MCP server to access tools, prompts, and datasets of the MCP server. A tool can be a modular software service or component that performs one or more tasks outside of an AI model's or AI agent's native capabilities. Tools can perform specific tasks, such as running code, querying a database, calling an application programming interface ("API"), generating or transforming a file, and the like. Example tools include a SALESFORCE tool, a file writer tool, a weather tool, and OUTLOOK tool, among others. Tools can serve various purposes, including system operations (executing commands, reading and writing files, managing processes, system monitoring), API integrations (fetching web content, querying databases, interacting with cloud services, social media integration), and data processing (data cleaning, format conversion, visualization generation, statistical analysis).

Tools are a powerful primitive that enables servers to expose executable functionality to MCP clients. Through tools, LLMs can interact with external systems, perform computations, and take actions in the real world. Tools are designed to be model-controlled, meaning that tools are exposed from servers to clients with the intention of the AI model being able to automatically invoke them (with a human in the loop to grant approval). Each tool is defined with a name (i.e., a unique identifier for the tool), schema (i.e., the parameter structure using JSON Schema), description (i.e., text explaining the tool's purpose and usage), and examples (i.e., sample usage scenarios to guide LLMs).

Tool annotations provide additional metadata about a tool's behavior, helping clients understand how to present and manage tools. Annotations include title (a human-readable title for the tool, useful for UI display), readOnlyHint (if true, indicates the tool does not modify its environment), destructiveHint (if true, the tool may perform destructive updates, only meaningful when readOnlyHint is false), idempotentHint (if true, calling the tool repeatedly with the same arguments has no additional effect, only meaningful when readOnlyHint is false), and openWorldHint (if true, the tool may interact with an "open world" of external entities).

Prompts enable servers to define reusable prompt templates and workflows that MCP clients can easily surface to users and LLMs. They provide a powerful way to standardize and share common LLM interactions. Prompts are designed to be user-controlled, meaning they are exposed from servers to clients with the intention of the user being able to explicitly select them for use.

Prompts can be defined with a name (unique identifier for the prompt), description (explains the prompt's purpose), arguments (parameters that can be provided to customize the prompt), and template (the actual prompt content, which can include arguments).

Transports in MCP provide the foundation for communication between clients and servers. A transport handles the underlying mechanics of how messages are sent and received. MCP includes two standard transport implementations. STDIO transport enables communication through standard input and output streams. This is particularly useful for local integrations and command-line tools. STDIO is used when building command-line tools, implementing local integrations, needing simple process communication, or working with shell scripts. Server-Sent Events ("SSE") transport enables server-to-client streaming with HTTP POST requests for client-to-server communication. SSE is a unidirectional communication protocol where the server streams text-based updates to the client using the HTTP content type.

FIG. 1A is a flowchart of an example method for securely executing MCP processes in a nano sandbox. At stage 102, a gateway can execute an SSE bridge. The SSE bridge can identify a request to access an MCP server, which can also include a request to initialize an SSE channel with an MCP server. The request is sent from an MCP client that generates MCP-compliant commands in association with an AI agent. The SSE bridge can be part of an MCP orchestrator that allows for managing inputs and outputs to the MCP server. The MCP orchestrator can utilize management profiles created by administrators through use of an UI of the AI platform as described later with reference to FIG. 1D.

In one example, the MCP client can initiate the request to the SSE endpoint with a GET request. The Get request can include a nano sandbox definition in the header.

Based on the header, the definition, or a command included with the GET request, the SSE bridge can select a mode of operation for a nano sandbox. In a standard first mode, the SSE bridge opens an SSE channel with the MCP client and maintains the nano sandbox for ongoing interactions in a session with the MCP client. In a second "one-to-one" mode of operation, the SSE bridge can utilize an ephemeral nano sandbox that the SSE bridge terminates after the MCP process responds to the request from the MCP client. In this case, the request can include a one-off command that is executed in the nano sandbox.

At stage 104, the SSE bridge can instantiate a nano sandbox based on a definition extracted from the request. The nano sandbox is an isolated execution environment and can be ephemeral. The specific environment can be defined by the definition. The definition can be included in a hypertext transfer protocol ("HTTP") header of the request. The request can be an HTTP post from the MCP client.

The SSE bridge can create the nano sandbox using a bubblewrap command that restricts file system access to one or more specified directories. The bubblewrap command can define network access and establish system call filtering for the nano sandbox.

The nano sandboxes can be created inside of a privileged container that runs in Kubernetes. In one example, a web service request creates a nano sandbox and can do so using bubblewrap. Using bubblewrap within the context of a web request, the nano sandboxes can be isolated environments in the kernel with read-only system resources, such as directories, libraries, and files needed to execute the MCP process. Binding read-only system resources can refer to binding a read-only file system, system directory, system library, or system file.

In this restricted environment, a subprocess can execute the MCP process, such as a tool. Input variables can be provided to the nano sandbox. The input can then be used in executing the MCP process. Likewise, other information, such as customer data, can be placed in read-only files and read into variables for execution with the customer script. Customer data can include things such as user name, user ID, email or contact information, role, group identifier, tenant ID, access permissions, previous queries and conversations, recent activity, session history, preferred language and communication style, purchase history, device information, user goals or tasks, feedback, ratings, or user-supplied files. This sort of customer data can be relevant to tool usage.

In one instance, the header definition causes the SSE bridge to instantiate the nano sandbox in a single-command mode. That mode causes the nano sandbox to be created, used, and terminated in response to the command.

In one example, the definition identifies a first tool. The MCP process (i.e., MCP server) can be selected based on the first tool. The nano sandbox can be created to include resources dependencies of the first tool. Different tools can be associated with different resource dependencies. An MCP server can support one or more tools, prompts, and datasets.

At stage 106, the SSE bridge can launch the MCP server within the nano sandbox. The MCP server can define one or more tools, prompts, and datasets accessible to the MCP client.

After launching the MCP process (i.e., MCP server), the SSE bridge pings the nano sandbox. The nano sandbox returns the ping when the MCP server is initialized. The SSE bridge waits for the returned ping before sending the returning the session identifier to the client.

The SSE bridge can include a timeout threshold for receiving the returned ping. If the threshold is exceeded, the SSE bridge sends a kill signal to the MCP server, which can include attempting to terminate the nano sandbox itself.

When a return ping is received, the SSE bridge can continue setting up the connection with the MCP client. This additional setup can be bypassed in "one-to-one" mode, in one example, since the nano sandbox is destroyed after returning the result.

For standard streaming mode, at stage 108, the SSE bridge can return, to the MCP client, a session identifier that identifies the nano sandbox. The session identifier can be a message ID in one example. This can allow the SSE bridge to route future commands to the correct nano sandbox and the correct MCP client.

At stage 110, the gateway can receive, from the MCP client, a command and the session identifier. The command can be inspected against security policies, as will be discussed in relation to FIG. 1C. The command can be a remote procedure call ("RPC") encoded in JSON, called a JSON-RPC command.

Using the session identifier, the SSE bridge can forward the command to the nano sandbox at stage 112. The MCP server can utilize STDIO-based communication. Therefore, the SSE bridge can write the command to the STDIN pipe of the nano sandbox, causing the MCP server to execute the command within the nano sandbox at stage 114.

At stage 116, the SSE bridge can receive an output of the MCP server in the nano sandbox by reading from the STDOUT pipe. The SSE bridge receives the output on an STDOUT pipe of the MCP server.

At stage 118, the gateway can send a response over the SSE channel to the MCP client, wherein the response is the output or a modified version of the output.

Again, for one-to-one mode, the SSE channel is optional. Instead of an SSE channel, a JSON-RPC response can be returned from SSE bridge to the MCP client.

When the SSE connection closes or when the one-to-one mode completes, the SSE bridge terminates the MCP server.

Figure 4:
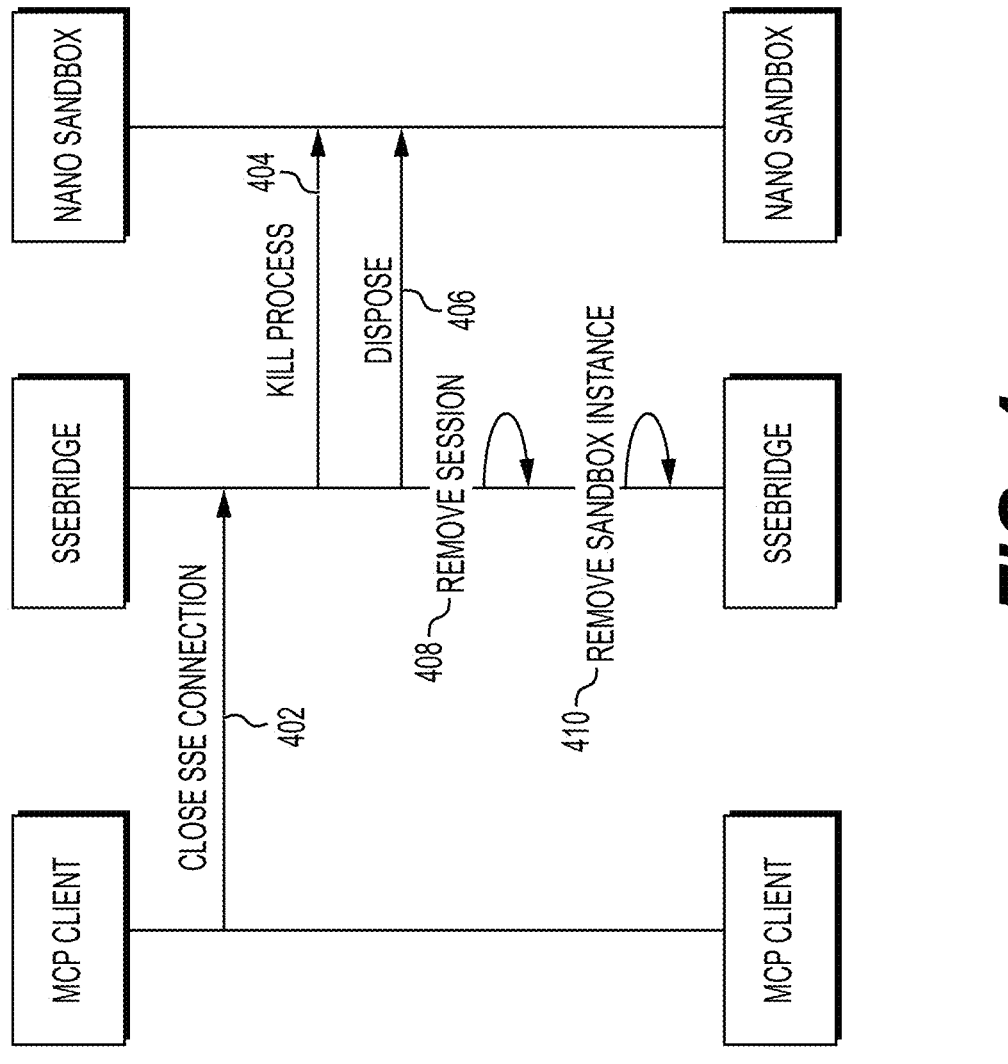
FIG. 4 is a sequence diagram of an example method for terminating a nano sandboxed MCP process.

This is discussed more elaborately in connection with FIG. 4. The SSE bridge can dispose of resources used by the nano sandbox and remove the nano sandbox from memory.

FIG. 1B is a flowchart of an example method for detecting changes in an MCP server enforcing and security policies. Detecting the changes can be important in order to prevent rug pull attacks and tool poisoning, among other relatively low-tech malicious activities.

This method can be used on both types of MCP servers-those that are executed in a nano sandbox with an STDIO process, and those that are remotely accessed through an SSE connection. The remedial actions available for detected changes differ for the two types of MCP servers.

At stage 132, the SSE bridge can send a request to an MCP server for a list of resources. In response, at stage 134, the SSE bridge can receive a first list of resource identifiers and resource profiles from the MCP server. The resource identifiers can identify particular tools, datasets The first list can indicate the tools and instructions available at a first version of the MCP server at that time (a first time). Instructions can be provided with a tool ID to an LLM or other AI model type. The instructions can help the AI model understand how to use the tool. However, if the model signature or instructions change, the AI model can use the tool in a way that is potentially harmful or can cause loss of PII or other data.

At stage 136, the AI platform or gateway stores the first list. This can be stored in memory, such as in a table, JSON, or database. The list can be stored with each tool and corresponding instruction(s), in an example.

At least a subset of the tools and instructions can have administrative approval for use. This can be automatic, based on system settings. Alternatively, at stage 138, an administrator can approve use of the tools or instructions on a UI. In one example, the UI displays a set of tools in the first list. The UI includes activation toggles for each of tools of the set, and wherein the administrative approval of the subset of the tools is based on the activation toggles. The SSE bridge can be restricted to sending the command to the tools in the subset that is administratively approved. An incoming command is checked against the subset that is administratively approved prior to writing the command to the STDIN pipe of the nano sandbox.

At stage 140, the SSE bridge can receive a second list of tools and instructions available at the MCP server. The second list can include the tools and instructions available at a second version of the MCP server at a second time. The SSE bridge can request the list periodically, can make the request as part of pining the launched MCP process, or can be triggered to make the request as part of receiving a command from the MCP client.

At stage 142, the SSE bridge or some other process can detect a difference between the first list and the second list. The difference can apply to the subset with administrative approval—that is, a currently approved tool or instruction can now be changed.

Detecting the difference can include comparing a first checksum of the first list to a second checksum of the second list. Detecting the difference can comprise evaluating the second list based on security rules for data loss prevention. The security rules can include a whitelist of permissible tools against which the second list of tools and instructions is compared. The existence of a whitelisted permissible tool does not trigger detection of the difference, in an example. Likewise, the security rules can include a blacklist of impermissible instructions against which the second list of tools and instructions is compared. The existence of a blacklisted impermissible instruction triggers detection of the difference, in an example. In another example, detecting the difference between the first list and the second list comprises identifying a new tool signature in the second list that does not exist in the first list.

As a result of the change, at stage 144, the AI platform, gateway, or SSE bridge can perform a remedial action based on the difference. The remedial action can include blocking use of the tool impacted by the difference or blocking use of the MCP server altogether. This can include blocking the SSE bridge from sending a command to a first tool that is impacted by the difference. In an instance in which the MCP server is remotely accessed through SSE streaming, the SSE bridge can be blocked from sending a command to the first tool.

When the second version is blocked and the MCP server type is STDIO, the SSE bridge can continue to launch and/or execute the first version of the MCP process. For example, after detecting the difference but prior to receiving approval of the second version, the SSE bridge can still create a first nano sandbox for execution of the first version of the MCP server, wherein the SSE bridge forwards a command for the first tool to the first nano sandbox.

Alternatively, or in addition, an administrative user can be alerted that a change exists for a specific tool or instruction. The administrator can log into the AI platform or gateway using a user device, which can be any processor-enabled device. The UI can display a visual indicator of the change. The UI can, for example, highlight an impacted tool or indicate a new version exists. Based on the administrator making a UI selection to select the tool or new version, the gateway or AI platform can cause display of a side-by-side comparison of a first tool and instruction that are different. The UI can include an option related to activating the second version.

In one example, the administrator is alerted but security policies applied by a rules engine to the difference can result in the SSE bridge still being allowed to use the MCP server or specific tool.

After receiving approval of the second version, the SSE bridge can create a second nano sandbox for execution of the second version of the MCP server. Then the SSE bridge forwards the command for the first tool to the second nano sandbox.

The process can be iterated for future change detection. For example, the SSE bridge can store the second list of tools and instructions of the MCP server. Then the system can receive a third list of tools and instructions available from the MCP server, either by subscribing to changes or by polling the MCP server again. The third list can include the tools and instructions available at a third version of the MCP server at a third time. A remedial action can be performed again if a difference exists between the second and third versions. For example, the gateway can cause the UI to notify the administrative user regarding a second difference between the second list and the third list.

Whether or not to automatically block SSE bridge activity can depend on a security policy applied to the change. The security policy, which can be stored at a gateway and received from the AI platform, can describe different changes and prescribe different remedial actions. For example, based on detecting a new tool signature for the MCP server, the security policy can cause the SSE bridge to be blocked from using the MCP server.

When the SSE bridge is blocked, an alert can be sent to an administrative user regarding the blocking. Once the change is approved, the block can be automatically lifted.

The gateway can also check the command and output against security policies to ensure that neither indicates an attempt to perform a malicious act. This can include validating that the command complies with security rules associated with MCP tool usage and validating that the result complies with the security rules.

After the result is returned from the nano sandbox and/or the SSE channel closes, the SSE bridge can protect against data loss by sending a kill signal to the MCP server and deleting the nano sandbox from memory.

FIG. 1C is a flowchart of an example method for providing a gateway for secure MCP server access. The MCP gateway can allow customers to centralize MCP server interactions and apply uniform security policies to those interactions. The gateway can audit all on-behalf-of operations and provide a central point where security solutions can observe and respond to potential attacks. The gateway can operate the nano sandbox in both modes. Additionally, the gateway can handle requests and commands for both types of MCP servers-nano sandboxed STDIO processes and remotely streamed MCP processes.

The methods of FIGS. 1A and 1B can both be applied at the MCP gateway.

Turning to FIG. 1C, at stage 152, the gateway can receive a first request to utilize a first MCP process. The MCP process can be an MCP server or some other MCP-related task. The first request can be sent by an MCP client used by an AI agent. The first MCP process can be identified in the header in one example.

At stage 154, the gateway can determine whether the first MCP process utilizes standard input/output ("STDIO") transport or server-sent events ("SSE") transport. At stage 156, in an instance in which first MCP process utilizes STDIO transport, the gateway can create a nano sandbox for running the MCP process. As described in FIG. 1A, this can include instantiating, by an SSE bridge, a nano sandbox based on a definition, wherein the definition is extracted from the first request or retrieved based on identification of the MCP process, and wherein the definition defines a restricted execution environment of the nano sandbox. The definition is included in an HTTP header of the request.

In one mode, the nano sandbox can be an ephemeral container that the SSE bridge terminates after sending the output to the MCP client. Alternatively, in another mode, the nano sandbox can persist for additional commands after the SSE bridge sends the output to the MCP client.

After receiving a ping from the MCP process, the SSE bridge returns a message identifier to the MCP client. The first command includes the message identifier.

At stage 158, the SSE bridge can execute the first MCP process within the nano sandbox.

At stage 160, in an instance in which first MCP process utilizes SSE transport, the SSE bridge can open a persistent connection for the first MCP process to stream messages back to the MCP client.

At stage 162, the gateway can receive a first command from the MCP client.

The gateway can advantageously provide security guardrails and observability to the inputs and outputs to the MCP processes. The gateway can be equipped to monitor, log, and inspect the input/output behaviors of subprocesses and real-time event streams within the system, such as for debugging, auditing, orchestration, or intelligent routing. The gateway can therefore report what code was run, what abnormal outputs or errors were generated, and the like. The gateway can also report non-compliance with security rules.

The guardrails can be customized and operate as separate security tools that are added to a tool specification, such as adding the new security tools to the resource profile. This can cause an MCP server, gateway, or MCP client to call the security tools as part of issuing a resource command.

For security purposes, at stage 164, the gateway can verify that the first command complies with security rules. The security rules can be received from the AI platform and can relate to detecting and preventing prompt injection, code injection, and attempts to access restricted commands, tools, or APIs. The security rules can include a whitelist of allowed commands or a blacklist of disallowed commands to which the incoming command is compared.

In one example, the SSE bridge verifies that system resources and permissions indicated by the definition meet security rules prior to instantiating the nano sandbox.

If the command complies with the security rules, at stage 166 the gateway can route the first command to the first MCP process. The routing can be based on a session ID, which can be a message ID. The SSE bridge can write the command to the STDIN pipe of the appropriate nano sandbox.

At stage 168, the gateway can validate an output of the MCP process based on the security rules. This can include checking for system prompts and other such outputs on the STDOUT pipe. Additionally, the gateway can log errors on the STDERR pipe, and recognize errors related to nano sandbox escape attempts. Validating the output based on the security rules can include checking the output for scripts prior to sending the output from the gateway to the MCP client.

At stage 170, the gateway can send a compliant output to the MCP client.

The gateway can instantiate multiple different nano sandboxes to handle multiple MCP clients and even different tenants. Another MCP process executes in a second nano sandbox than the first MCP process. The gateway can receive a second command that includes a different message identifier than the first command, wherein the SSE bridge routes the first and second commands routed to the first and second nano sandboxes respectively based on the different message identifiers. The gateway can receive commands from multiple different MCP clients, with different tools approved as available to the different MCP clients.

The gateway can track lists of tools and instructions for identifying changes, as discussed in FIG. 1B. A UI can display available tools and instructions for a plurality of MCP processes, including the first MCP process.

Closing an SSE connection between the MCP client and the SSE bridge causes the SSE bridge to send a kill command to the MCP process and delete the nano sandbox.

FIG. 1D is a flowchart of an example method for securely executing artificial AI agents based on UI selections of administrator-defined restrictions to MCP servers. This method relates to administrative setup of management profiles that apply to the MCP servers, including the specific resources available through those MCP servers. Corresponding UI screens are illustrated and described later with respect to FIGS. 9, 10, and 11.

At stage 180 of FIG. 1D, the AI platform, gateway, or SSE bridge receives a resource profile that corresponds to a resource available at an MCP server, wherein the resource profile describes a tool and multiple resource commands. The resource profile can be received by request from the MCP server, but subscribing to changes to resource profiles of the MCP server, by API command to a provider of the MCP server, or by scraping information about the MCP server from a provider website.

A resource profile may include various types of metadata and descriptors that define the characteristics, constraints, and semantics of a tool or command accessible via the MCP server. Each resource profile may contain a unique identifier, such as a URI, UUID, or human-readable name, that distinguishes the resource within the system. The profile may specify one or more tools or resource commands being exposed, including invocation mechanisms, such as a command-line string, API endpoint, or reference to an executable container or function. In some embodiments, the resource profile includes a natural language or structured usage description that conveys the function and intended use cases of the resource. This description may be formatted in a machine-readable manner, allowing AI models to evaluate whether a particular tool is appropriate to execute in a given context.

In addition to the usage description, the resource profile may define the expected input and output schemas associated with the tool, including parameter names, data types, whether parameters are required or optional, and example input-output pairs. Constraints may also be included, such as rate limits, authentication or access control requirements, environmental or hardware dependencies (e.g., GPU availability or operating system compatibility), and any applicable licensing or usage restrictions. The resource profile may include semantic tags or vector embeddings representing the tool's function or domain, which can support AI-driven selection based on natural language prompts or inferred intent.

Furthermore, the resource profile may include scoring or weighting metrics indicating the relative preference of the tool when multiple tools are available for a similar task. It may also contain execution context metadata, including runtime environment details, expected latency or runtime estimates, and any known side effects of execution (such as modifying external data or interacting with other systems). Observability and monitoring data may be included, such as links or endpoints for telemetry, logging, or audit trails. Versioning metadata can also be specified within the profile, including version numbers, deprecation notices, compatibility notes, and validity timeframes. Finally, a resource profile may include references to external documentation, human-readable descriptions, or UI elements that aid in understanding or managing the resource, either by users or system administrators.

The AI platform can utilize the resource profiles to populate a UI of various security restrictions that an administrator can place on MCP operations. These can include restricted actions that relate to either the resource commands or to changes in the MCP profile itself, such as when new versions of the MCP server are released. The restricted actions may also account for changes in tool behavior due to environmental reconfiguration, such as updates to containerization parameters, or the addition of new callable APIs that were not present in prior versions.

At stage 182, the AI platform can cause display, at a user device, of a UI for configuring AI agent usage of a resource of the MCP. At stage 184, the UI can display an option for selecting restricted actions. The restricted actions can correspond to at least one of a specific change to the resource profile, a change quantity of the resource profile, a restricted resource command to the MCP server, or a restricted output of the MCP server. A specific change can identify a particular type of change or one or more keywords that are restricted from being included in an updated resource profile for the MCP server. When a change is detected, an AI model can identify the change type (e.g., a new resource command) or identify the keywords associated with the change (e.g., a system file modification). For example, an administrator may configure restrictions to prohibit the addition of commands related to direct file system access, encryption key export, subprocess creation, or network socket binding. These prohibited actions may be identified by semantic intent rather than exact keyword match, leveraging large language model embeddings to infer risky behaviors from vague or obfuscated descriptions.

In contrast, a change quantity can represent a percentage change to the resource profile, or a score that represents the semantic divergence of the change. The score can be based on specific changes having various weights and/or the AI model being prompted with rules for calculating the change quantity. The change quantity can be represented by one or more change thresholds that are user-definable on the UI. Different change thresholds can be set to correspond to different threat levels to data security. For example, a large amount of change or a high score based on identifying multiple specific changes can indicate a higher likelihood of data security issues. The administrator can likewise set different remedial actions to correspond to the different change thresholds. In some cases, the semantic divergence score may be computed using embeddings of the prior and updated resource profiles, with cosine similarity or other distance metrics used to estimate conceptual drift. A low similarity score may indicate the introduction of new potentially risky latent capabilities.

The UI can also display options for selecting allowed actions. The allowed actions correspond to allowed resource commands, allowed outputs, and allowed changes to the resource profile. The allowed actions do not trigger the first remedial action, in an example. The administrator can still define permissions for selected allowed actions. For example, selected permissions (e.g., read only) for a first allowed action are applied to a corresponding allowed resource command. Granular permissions can include restrictions on output destinations (e.g., disallowing STD-OUT or network-based output), input provenance (e.g., permitting only AI model-generated commands versus user-entered commands), or contextual constraints (e.g., time-of-day or user role).

At stage 186, the UI presents options for selecting triggers that correspond to the restricted actions. The triggers can be based on the presence of the restricted action, or can cause the restricted actions to be worth a point value towards a threshold (e.g., a change threshold). When exceeded, the threshold can act as a trigger. Multiple triggers can be combined using logical operators (e.g., AND, OR, NOT) to create complex security policies that require simultaneous conditions to be met before a remedial action is invoked.

At stage 188, the UI can display options for selecting remedial actions that correspond to the triggers. The remedial actions can dictate the system's response to detecting the trigger. For example, the remedial action can include an alert while still allowing the change, restricted resource command, or restricted output. Alternatively, the remedial action can block the change, restricted resource command, or restricted output. Additional remedial actions can include sandboxing the tool in a more constrained environment, requiring higher-level user access permissions, or initiating a version rollback of the MCP server or profile. In certain examples, the remedial action may initiate an LLM-based explanation of why the action was blocked, improving transparency and auditability.

At stage 190, the UI can display selectable permissions that apply to the restricted actions. These can include read and write permissions. The permission dictate whether a resource command or tool has read or write permissions to user files or system resources. Additional permission types can include execution rights, inter-process communication ("IPC") permissions, and network access controls (e.g., domain whitelisting or port-level restrictions), giving administrators deeper control over potential exfiltration vectors.

At stage 192, the AI platform can receive the administrator's UI selections. These can comprise selected restricted actions, selected triggers, selected permissions, and selected remedial actions. The UI may also support the definition of reusable policy templates or configuration presets that apply to commonly used MCP servers or tool profiles, streamlining setup and ensuring consistency across deployments.

At stage 194, the AI platform creates a management profile (also called a resource output management profile) based on the received UI selections. The management profile includes the relationships between the selected restricted actions, the selected permissions, the selected triggers, and the selected remedial actions. The AI platform makes the management profile available to an MCP orchestrator, such as the SSE bridge. The management profile may be versioned and digitally signed to ensure integrity, authenticity, and traceability of administrative intent, particularly in regulated environments or multi-tenant systems.

At stage 196, the MCP orchestrator detects a first restricted action defined by the management profile. This can include identifying a first trigger defined in the management profile, and triggering a first remedial action associated with the first trigger. Detecting the first restricted action can include identifying the specific change to the resource profile. Alternatively, the detection can be based on a change threshold being met. Again, multiple change thresholds can be predefined, for example, based on receiving UI selections to create first and second change thresholds. A first change threshold can correspond to the first remedial action and the second change threshold corresponds to a second remedial action.

Detecting the first restricted action can comprise detecting the change quantity by comparing a deviation amount of the resource profile against the first and second change thresholds. The deviation amount can be a score that is determined by an AI model or based on specific keywords and their score values. When the deviation amount exceeds the first change threshold but not the second change threshold, the MCP orchestrator can trigger the first remedial action but not the second remedial action. This can occur when the second change threshold represents a higher risk to data security than the first change threshold. For example, the second remedial action can comprise blocking a first resource command from reaching the MCP server, whereas the first remedial action comprises displaying an alert. Alternatively, the first remedial action can comprise applying the selected permissions of the management profile to a first resource command. This can limit the permissions in a way that reduces risk of data loss or various attacks.

The first remedial action can cause the UI to display an alert. This can allow an administrator to see when a potential harmful change, output, or resource command has been recognized by the MCP orchestrator. Displaying the alert can comprise displaying selectable suggested functional remedial actions ("SFRAs"). SFRAs can be those remedial actions that would be taken if a threshold were met (even though it currently is not) or other remedial actions that have been assigned to the restricted action or a related restricted action. In one example, the AI model can recommend SFRAs from the subset of selected remedial actions that are present in the management profile. Additionally, the SFRAs can be assigned in advance (by the UI selections or AI model) to the trigger.

The administrator can then elect to select one or more of the SFRAs. Those can be submitted for execution by the MCP orchestrator. For example, executing a selected SFRA can include terminating the MCP server and deleting the nano sandbox in which the MCP server executed.

Displaying the alert can also include displaying multiple change thresholds and corresponding remedial actions, wherein the multiple change thresholds and corresponding remedial actions are defined in the management profile. Corresponding remedial actions of the multiple change thresholds are selectable on the UI, causing the MCP orchestrator to execute the selected corresponding remedial actions.

In one example, the first restricted action corresponds to the restricted output from the MCP server. Executing the remedial action can include blocking the restricted output from being transmitted to an MCP client. Alternatively, if the output includes sensitive user identifiers, API keys, or security tokens, the MCP orchestrator can redact the information prior to transmission or route the output to a secure logging channel for administrative review.

The restricted output can include a specific output having one or more keywords defined by administrator selections on the UI. This can allow the MCP orchestrator to screen for those specific outputs from the MCP server prior to forwarding the outputs to an MCP client. In another example, the MCP server utilizes an AI model to identify a restricted semantic meaning in the output.

FIG. 2 is a sequence diagram of an example method for a one-to-one operation mode of an ephemerally nano sandboxed MCP process. This is a server environment designed to run MCP STDIO processes in a controlled way. The system, which can run on a gateway, serves as a bridge between clients and processes using JSON-RPC commands via standard input/output streams.

The nano sandbox operates in two modes. In one-to-one mode, the system creates a single nano sandbox for each request. The nano sandbox terminates when the process ends. In standard mode the MCP client connects by SSE, defines the nano sandbox in the headers, receives a session ID (e.g., message ID), and sends JSON-RPC commands to the nano sandbox, receiving responses through an SSE channel.

The SSE bridge listens for communications and can maintain a persistent event stream connection between the MCP client and the MCP process, in an example.

At stage 202, the MCP client sends a JSON-RPC command to the gateway, which is received by the SSE bridge. The command can be sent over a regular HTTP or SSE connection. As discussed with FIG. 1C, the gateway can inspect commands for malicious cod or prompt injections. Commands that do not comply with the security rules can be blocked, logged, and reported.

An example JSON-RPC command from the MCP client is shown below:

```
{
    "jsonrpc": "2.0",
    "id": "42",
    "method": "generate_summary",
```

```
    "params": {
        "text": "Artificial Intelligence has made significant
            strides in recent years, particularly in the domain of
            natural language processing . . . "
    }
}
```

This command follows the JSON-RPC 2.0 specification, asks to invoke the generate_summary method, passes a text string as a parameter, and expects a result back under session ID: 42.

Then, at stage 204, the SSE bridge forwards the command to the nano sandbox. The nano sandbox is a secure, isolated environment responsible for safely executing untrusted processes. In this case, an MCP process executes in the nano sandbox. The nano sandbox mediates communication between the SSE bridge and the actual MCP process.

At stage 206, the nano sandbox sends the commands to the MCP process by writing to STDIN. The MCP process executes the command. This can include communicating over a network outside of the nano sandbox to a resource at stage 208. For example, the MCP server can make an API call to a dataset, a backend system, or a provider's remote AI model. The resource can return a result to the MCP server within the nano sandbox. But the nano sandbox can prevent the MCP server from accessing user or system files other that the ones specifically provisioned within the nano sandbox. This security feature ensures that if there is back-and-forth between the resource and the MCP server, the resource cannot access unauthorized files or write or delete within unauthorized system folders.

An output is written to STDOUT at stage 210. Based on the example command, an example output could be:

```
{
    "jsonrpc": "2.0",
    "id": "42",
    "result": "AI has recently advanced, especially in natu-
        ral language processing."
}
```

The SSE bridge can read this output from the STDOUT pipe at stage 212. Then, after checking the output against security rules, at stage 214, the SSE bridge can return the output as a response to the MCP client.

In one example, the lifecycle of the nano sandbox can be driven by a single HTTP POST that contains the nano sandbox definition, includes the JSON-RPC command, waits for the MCP output, then destroys the nano sandbox. Such an example can be a stateless, request-response model, which corresponds to a one-to-one mode and the sequence diagram of FIG. 2. This mode is particularly suitable for short-lived, stateless operations where process isolation is important and the overhead of creating new containers is acceptable.

Figure 3:
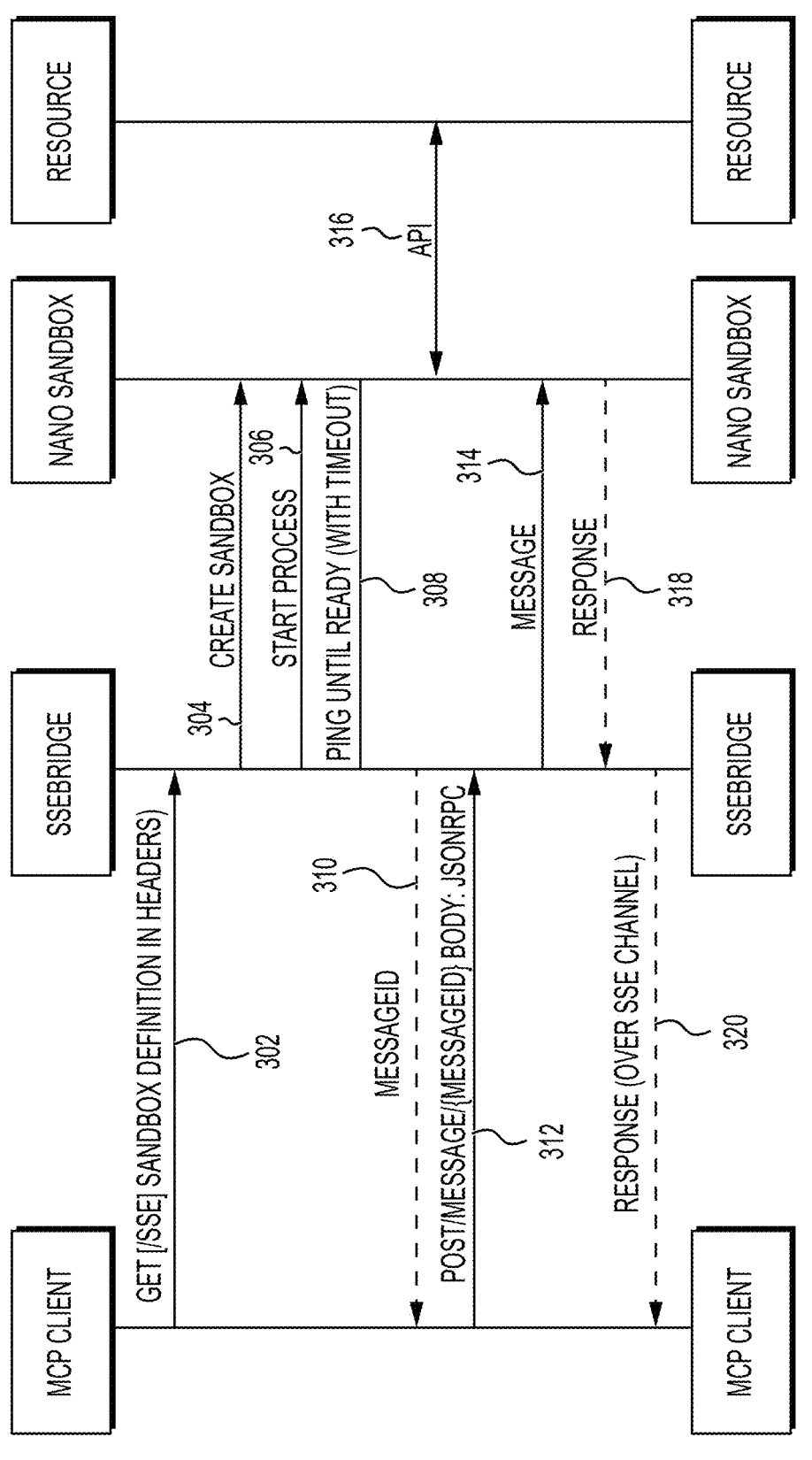
FIG. 3 is a sequence diagram of an example method for creating an SSE connection and streaming communications with a nano sandboxed MCP process.

FIG. 3 is a sequence diagram of an example method for creating an SSE connection and streaming communications with a nano sandboxed MCP process. The sequence diagram illustrates a "standard mode" usage of the nano sandbox. The gateway implements a persistent connection approach where nano sandboxes are created and maintained for ongoing interactions, enabling multiple message exchanges over a single established session. This approach provides long-lived connections using SSE protocol. Nano sandbox definitions can be provided through HTTP headers. Message IDs assigned to correlate requests with responses. This mode can be used for persistent MCP processes that handle multiple commands. The SSE bridge or another process performs manual cleanup when SSE connections close.

At stage 302, the MCP client initiates a GET request to the SSE endpoint. The GET request is not a typical GET just for retrieval. Instead, the request initiates an SSE channel between the client and the SSE bridge. The request also carries a definition of the nano sandbox environment in the headers. This can include what kind of tool or model to run, resources needed, and the like. For nano sandbox creation, the HTTP header can serve as a primary mechanism for transmitting nano sandbox configuration parameters.

At stage 304, the SSE bridge creates the nano sandbox based on the extracted definition. An example definition is shown below:

```
{
    "Command": "npx",
    "Arguments": ["-A", "-y", "-q", "@tokenizin/mcp-
       npx-fetch"],
    "EnvironmentVariables": {
       "BRAVE_API_KEY": "api-key"
    }
}
```

The above is an example JSON object that defines how the nano sandbox should initialize and launch the STDIO MCP process (i.e., the MCP server inside the nano sandbox). The JSON object is passed as part of the headers (i.e., metadata) in a GET/SSE request to the SSE bridge, which uses the definition to start the correct nano sandboxed process. The JSON can be deserialized into a structured configuration object. Configuration can be validated for security and completeness. Then, parameters are translated into bubblewrap command-line arguments.

Commands are checked against allowed or blocked lists. Resource limits and security rules can be enforced.

"Command" "npx" tells the nano sandbox to run the Node.js package runner npx. The command npx is used to execute a Node package without installing it globally.

"Arguments": ["-A", "-y", "-q", "@tokenizin/mcp-npx-fetch"]

These are flags and parameters passed to npx. -y auto-confirms any prompts, -q sets the execution to quiet mode. "@tokenizin/mcp-npx-fetch" indicates the actual package to run in the nano sandbox as the MCP process. It can indicate an MCP-compliant tool provided by the @tokenizin npm scope. It will be executed by npx and is expected to behave like a JSON-RPC STDIO server.

Depending on implementation, the system may support additional headers. For example, an authentication header can include bearer tokens or API keys. A resource limits header can define memory, CPU, or time constraints. A network policy header can define network access, if any. File system mounts can be defined in the header. This can dictate which file systems are mounted within the nano sandbox for use with the MCP process. Session parameters can indicate timeout settings and keep-alive options. Debugging flags can specify verbose output or additional logging.

In the header value example above, environmental values are defined: "EnvironmentVariables": {"BRAVE_API_KEY": "api-key"}.

These environment variables can be injected into the nano sandbox process environment. For example, the MCP process can see BRAVE_API_KEY=api-key in its environment. This can be used internally by @tokenizin/mcp-npx-fetch to authenticate or query an external API.

Using this definition, the SSE bridge can create the nano sandbox at 304. The nano sandbox can be created using bubblewrap (bwrap), with communication handled with STDIN and STDOUT. The environmental parameters can be translated into bubblewrap command-line arguments. The bubblewrap command is constructed with appropriate isolation flags. This can include restricting file system access within the nano sandbox to specified directories that are copied into the nano sandbox. Network access can be configured according to security requirements. System call filtering can be applied to limit potential attack surfaces.

Next, at stage 306, the target MCP process (in this example, the npx command) is launched within the bubble-wrap container. STDIO streams are connected to the isolated process. STDIN pipe is created for sending commands to the process, and an STDOUT pipe is established for receiving responses. These pipes form the primary communication channel for JSON-RPC messages.

At stage 308, the SSE bridge pings the MCP process until receiving a return ping. The SSE bridge pings the MCP process (via STDIO or health checks) to ensure the MCP process is ready before accepting messages. When the process responds, this indicates that initialization is complete.

If the MCP process does not come up in time, a timeout can occur. In that instance, the SSE bridge can send back a failure via the SSE channel.

Once the nano sandbox and MCP process are confirmed ready, at stage 310 the SSE bridge can return a session ID, in this case a message ID, to the MCP process. With the session ID, the MCP client can send JSON-RPC payloads to the MCP process at stage 312.

At stage 312 a POST includes the actual command in JSON-RPC format. The POST is the vehicle that delivers the JSON-RPC command:

The {MessageId} uniquely identifies the message (like a request ID).

The POST does not return the full response directly. Instead, the system is non-blocking, such that the response will come asynchronously through the open SSE stream to the MCP client established based on the GET at stage 302 or before.

At stage 314, the SSE bridge forwards the received JSON-RPC message to the correct nano sandbox instance. The correct instance can be identified by the session ID (e.g., message ID). Writing the JSON-RPC message to STDIN causes the nano sandbox to forward the command to the running MCP process.

The MCP process executes the command. This execution can include initiating network communication from within the nano sandbox to one or more external resources at stage 316. For example, the MCP server may make an outbound API call to access a cloud-hosted dataset, query a remote backend system, or invoke a third-party or provider-operated AI model hosted outside the sandbox environment. These interactions can involve synchronous or asynchronous data exchange, including request/response payloads, streamed outputs, or event-driven callbacks. The resource may return results or computed outputs to the MCP server, which remains executing within the security boundaries of the nano sandbox.

Although the MCP server can send and receive data to and from these external systems, the nano sandbox restricts access to the underlying file system and runtime environment. Specifically, the MCP server is prevented from accessing user files, system libraries, or device-level resources unless such assets have been explicitly provisioned or mounted into the sandbox by the orchestrator. This isolation ensures that even if the external resource attempts to exploit the communication channel—for example, by injecting malicious payloads or redirecting outputs to sensitive file paths—the sandbox environment enforces strict containment. As a result, unauthorized file reads, writes, or deletions outside the scope of the sandbox's allowed directories or permissions are blocked by design.

In some cases, the nano sandbox may enforce fine-grained network controls as well, such as domain-based allowlists or egress rate limits, to ensure that the MCP server cannot exfiltrate data to unknown endpoints or misuse access to privileged APIs. This layered architecture allows the MCP server to leverage dynamic, external resources while still maintaining strong guarantees around process isolation, data integrity, and runtime security.

At stage 318, the MCP process writes the output to STDOUT. The output is then read by or sent back to the SSE bridge. Additionally, the gateway monitors STDERR for error messages and exceptions.

At stage 320, the SSE bridge sends the response to the MCP client through the SSE channel. This can allow for real-time delivery even for long-running tasks, which can be ideal for AI inference, tool use, and the like.

When the SSE connection ends, the container and MCP process are terminated. This process isolation prevents access to the host system and enforces limitations on CPU, memory, and file system usage. Input validation protects against malformed commands.

FIG. 4 is a sequence diagram of an example method for terminating a nano sandboxed MCP process. This deletion process involves a sequence of cleanup operations to properly terminate processes, free resources, and maintain system stability when a nano sandbox is no longer needed.

Various trigger events can cause the termination of the nano sandbox and MCP process. For example, at stage 402, the MCP client can explicitly close the SSE connection. Alternatively, a session timeout can occur. Other triggers include error conditions or security rule non-compliance that require nano sandbox termination. Kubernetes or an orchestration system can likewise signal container shutdown.

When the trigger occurs at stage 402, the SSE bridge responds at stage 404 by sending a kill signal to the running MCP process within bubblewrap. In one example, a termination signal (SIGTERM) is sent first, allowing a graceful shutdown. However, if the MCP process does not respond within a timeout period, a forced termination signal (SIGKILL) follows. For the purposes of this disclosure, either signal qualifies as terminating the MCP process. All child processes spawned within the nano sandbox are also terminated.

The SSE bridge also closes the SSE stream if the stream is not already closed. The STDIN stream to the MCP process is flushed and closed, and STDOUT and STDERR are drained of remaining data. All pipes and communication channels can be closed.

At stage 406, the nano sandbox resources are disposed of. This includes terminating the bubblewrap container, deleting temporary files created during nano sandbox operation, freeing memory allocations specific to the nano sandbox, and releasing any network ports or sockets used by the MCP process.

At stage 408, the SSE bridge removes the session from its active registry. Correlations between message IDs and nano sandbox instances are cleared, and pending messages for the terminated nano sandbox are discarded.

At stage 410, the nano sandbox instance is removed. The nano sandbox object is marked for garbage collection and references to the nano sandbox are removed from the gateway. In one-to-one mode, the entire container terminates. In standard mode, only the specific nano sandbox instance need be removed in some examples.

Failed deletions are logged, and cleanup operations continue even if some steps fail.

This process can maintain system integrity by preventing resource leaks. Security is enhanced by ensuring no nano sandbox artifacts remain. Memory and processing resources are reclaimed.

The nano sandbox can also be destroyed when the HTTP request is completed (for one-to-one). The nano sandbox can be wiped from memory automatically. In one-to-one mode, when the process inside of the bubblewrap exits, the nano sandbox is automatically destroyed. This can include automatic teardown, which any mount points, namespaces, and temporary modifications being cleaned up. In one example, destroying the nano sandbox can include manual cleanup if a process inside of the nano sandbox does not terminate. Another process outside of the nano sandbox can monitor for this scenario and kill the ongoing process, such as with a kill <[Process ID]> command. The API can include functions for inspecting running processes inside of the nano sandbox, or a command such as ps or lsns can be used.

Figure 5:
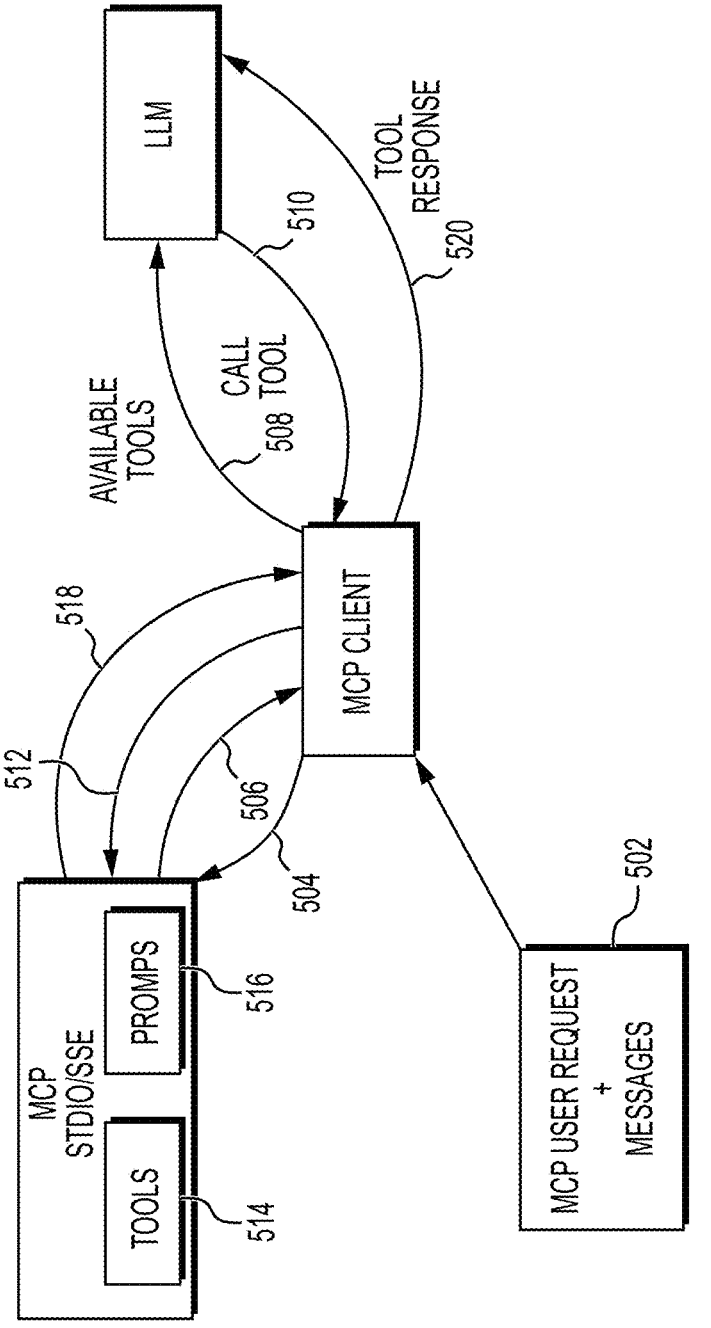
FIG. 5 is an example flowchart for MCP client usage of tools with an LLM.

FIG. 5 is an example flowchart for MCP client usage of tools with an LLM. At stage 502, a user request and messages are sent to an MCP client. This can be part of AI agent operation, such as a user asking the AI agent to perform a task that involves one or more tools. At stage 504, an MCP client can check with an MCP server (STDIO and/or SSE) to determine which tools 514 and prompts 516 are available. The MCP client can connect and pull the list of tool definitions. The list of available tools and prompts can be returned at stage 506.

At stage 508, the MCP client sends the tool definitions to the LLM. A tool definition can identify the tool and include instructions that the LLM can read to understand how to use the tool.

At stage 510, the LLM elects to use the tool, and sends a message to the MCP client. At stage 512, the MCP client then calls the MCP server to access the tool. The command can include an input from the LLM. The tool executes and sends a response to the MCP client at stage 518. The MCP client then sends the response to the LLM at stage 520. This allows the LLM to use the response from the tool in responding to the user's initial request and message from stage 502.

Although not shown explicitly in FIG. 5 for simplicity purposes, the gateway can act as an intermediary for executing the MCP processes at stage 504 and 512. The gateway can ensure that the MCP processes are isolated, receive a security compliant input at stage 512, and produce a security compliant output at 518. If the security rules are violated, then the gateway can prevent the output from reaching the MCP client at stage 518 and likewise prevent the LLM usage at stage 520.

Figure 6:
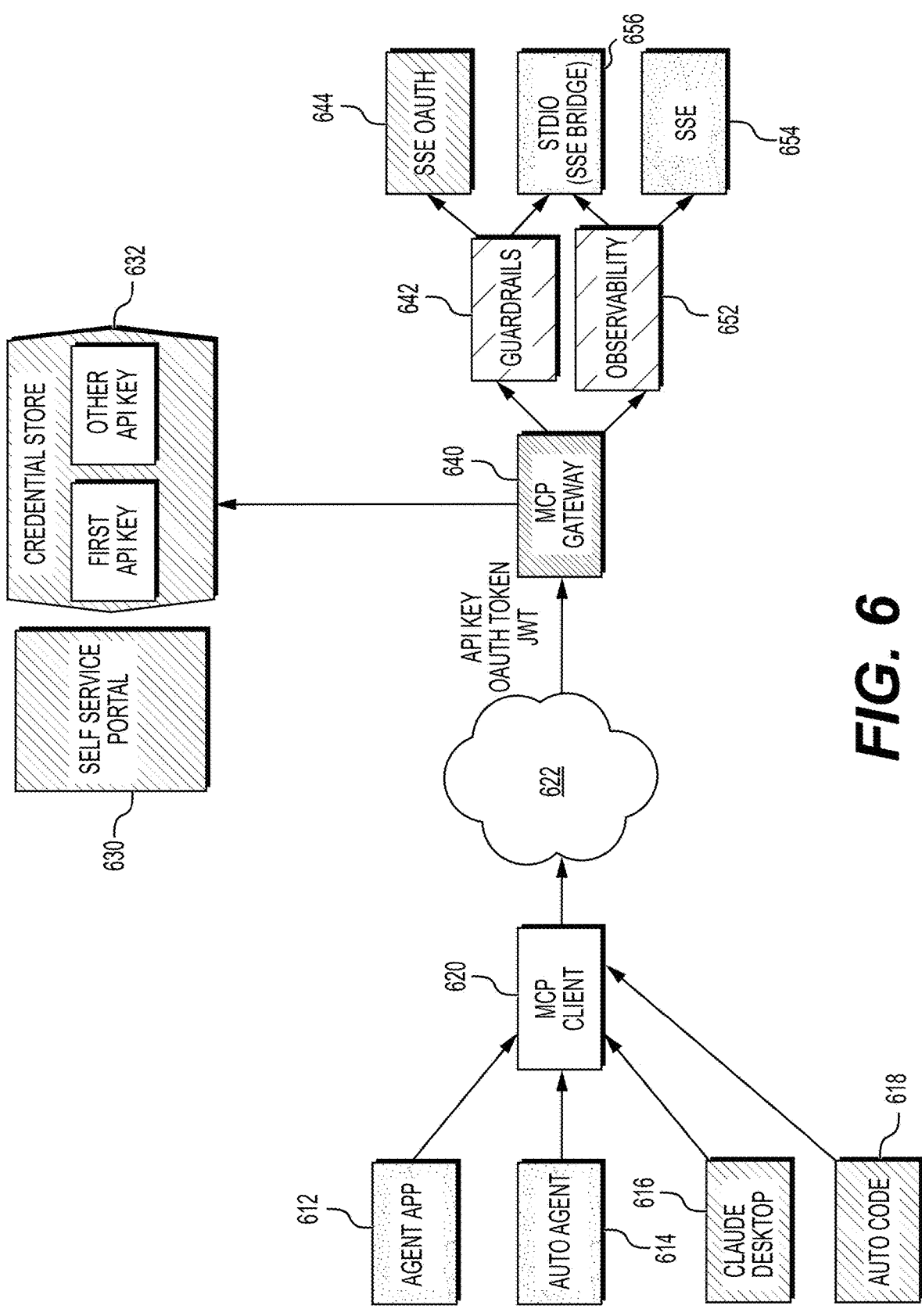
FIG. 6 is an example illustration of a system components for a gateway for secure MCP interactions.

FIG. 6 is an example illustration of system components for a gateway for secure MCP interactions. Various workflow automation platforms utilize an MCP client 620 for accessing MCP tools. In this example, a customized agent application 612, an automated AI agent 614, a CLAUDE desktop app 616, and an autonomous coding agent 618 all utilize one or more MCP clients 620. Those MCP clients 620 all connect to an MCP gateway 640 over a network 622.

The MCP gateway 640 can implement a variety of features to support secure, flexible, and scalable interaction with MCP servers. The gateway 640 can include a self-service portal user interface that enables users to browse a catalog of available MCP servers, including a curated collection of created servers such as those providing access to MICROSOFT Graph APIs. The system can support a community contribution workflow, allowing vetted third parties to submit MCP servers for inclusion in the catalog. The gateway 640 can manage connections to MCP servers over Server-Sent Events (SSE) and HTTP streaming protocols to enable efficient real-time communication. To support secure operations, the gateway can provide secure credential storage and management for OAuth tokens, personal access tokens (PATs), and other secrets, and can integrate with external credential management systems such as Keeper Security or AWS Key Management Service (KMS). The gateway 640 can further support deployment of custom MCP server packages directly from external repositories such as GitHub. To aid developers and administrators, the gateway can include a request/response debugging interface and a performance profiling dashboard that surfaces performance characteristics of MCP server interactions. An enterprise admin console can be provided to allow enterprise customers to generate and manage multiple MCP gateways 640, each with unique URLs and configurations. The admin console can further support workflows for approving MCP servers for use, as well as interfaces for managing (adding, removing, configuring) MCP servers associated with each gateway. Comprehensive usage auditing and reporting capabilities can be included to facilitate compliance and operational monitoring. The gateway 640 can support configuration of guardrails that constrain tool responses, along with a policy engine for enforcing governance rules such as permitted usage scenarios or user access controls. Additional features can include a data classification tagging system for labeling data handled by the gateway, capabilities to restrict access to specific model providers, and configurable gateway-specific security and access control rules to tailor each deployment to enterprise requirements.

The MCP client 620 can connect to the MCP gateway 640 over a cloud 622. The MCP client can authenticate using an API key, Oauth token, or a JSON Web Token ("JWT"). The MCP gateway can compare the credentials against those in a credential store 632, such as against ATLASSIAN API keys. The MCP gateway 640 can offer secure credential storage and management for Oath/PAT, in an example. This can include integrating with an external credential management system.

In this example, the MCP client 620 makes a request that establishes an SSE channel (indicated by the return arrow). The SSE channel is one-way and does not require the MCP client to expose any ports or open a hole in its firewall.

The MCP gateway 640 can perform the stages described in FIGS. 1A, 1B, 1C, and 1D. The gateway can provide both security guardrails 642 and observability functions 652. For example, the security guardrails 642 can include SSE Oauth 644 to authenticate and authorize SSE endpoints. Additionally, security rules can be applied to commands to an STDIO process 656 before writing to STDIN and prior to forwarding STDOUT as a response. Likewise, streams to SSE 654 can be observed for non-secure data.

The observability 652 extends to detecting changes in the MCP server, such as new tools, new tool descriptions, and the like. As discussed with regard to FIG. 1B, differences can lead to automated remedial actions and also administrative alerts.

A self-service portal 630 can allow administrative users to view security rule settings, specify which tools are approved, and view changes. The administrator can either approve changes or disapprove, causing the MCP gateway to either block commands, allow commands, or utilize prior allowed versions of an MCP server (that uses STDIO).

The MCP gateway 640 can be scalable, with a gateway service, deployment engine, credential management system, administration API, a policy enforcement engine, audit logging and compliance reporting, and user and role management.

The gateway service can function as the core proxy that routes requests between client applications and MCP servers, providing a central point of control and orchestration. It can support real-time communication protocols such as SSE and HTTP streaming to enable efficient data flows. The gateway service can incorporate credential management features, including secure handling of tokens and secrets to ensure authentication and authorization integrity. Additionally, the gateway service can perform request and response logging for auditing purposes, and may apply transformations to requests or responses as needed to enforce policies or adapt formats. The architecture can support multiple gateways 640, each with unique configurations and dedicated endpoints, enabling organizations to deploy isolated environments tailored to specific use cases, customer segments, or security requirements.

The deployment engine can manage the secure deployment of custom MCP packages, enabling customers to extend functionality by contributing their own server implementations. The deployment engine can perform container orchestration for Docker packages, ensuring that each deployment is properly provisioned, scaled, and managed throughout its lifecycle. In addition to containerized environments, the deployment engine can provide runtime support for packages authored in other languages and frameworks, such as NPX (Node.js), Python, and GoLang. This allows broad compatibility with diverse development ecosystems. To maintain security and tenant isolation, the deployment engine can enforce strict separation between customer environments. In particular, the deployment engine can prevent cross-tenant access and ensure that each customer's MCP servers execute in separately isolated, controlled nano sandboxes.

A custom MCP package includes the executable code that defines the MCP server's core logic, which can take the form of a Docker container, Node.js module, Python module, or GoLang binary The MCP package can also contain a manifest or metadata file specifying configuration details such as entry points, environment variables, dependencies, and API contracts that define supported endpoints, expected inputs, and output formats. The MCP package can include security configurations for authentication or authorization, such as credential or token requirements, and can optionally include static assets or configuration files used at runtime. The custom MCP packages can be deployed in nano sandboxes, enabling safe, flexible, and on-demand execution within the gateway architecture.

A credential management system, such as credential store 632, can provide secure handling of sensitive credentials required by MCP servers and MCP clients 620. The credential management system can include an internal credential store 632 that ensures all secrets are encrypted at rest, protecting them from unauthorized access. The system can expose integration APIs that allow seamless interoperability with external enterprise credential management solutions, such as Keeper Security, AWS Key Management Service ("KMS"), Azure Key Vault, and HashiCorp Vault, enabling organizations to centralize and control secret management according to their security policies. Additionally, the credential management system can include automated credential rotation and expiration management capabilities to minimize security risks associated with long-lived credentials and ensure that stored secrets remain up to date and compliant with enterprise governance requirements.

An administrative API and UI can allow for creation and deployment of these backend services, including gateway generation and management. Various portals can be available. For example, a developer portal can be accessed through a web application. Additionally, a community contribution system can allow for submission and review of workflows for community-created MCP servers. This can include version management, compatibility tracking, and rating and feedback mechanisms.

The MCP gateway 640 can handle various edge cases. For example, if the MCP server becomes unavailable, the gateway 640 can detect failure and attempt reconnection with exponential backoff. The gateway 640 can provide error messaging to MCP clients 620. If a custom MCP package contains malicious code, the deployment engine can scan packages, run the code in isolated environments, and have resource limitations to prevent abuse. If credentials expire during active session, the MCP gateway 640 can attempt to refresh tokens when possible. This can include prompting the user for reauthentication with context, in an example.

If an external credential store becomes unavailable, the MCP gateway 640 can fall back to cached credentials with notification to an administrator. The MCP gateway 640 can implement retry mechanisms.

Additionally, if an enterprise policy conflicts with MCP server 640 capabilities, the Admin UI can validate policies against server capabilities and highlight conflicts during configuration. Multiple MCP gateways 640 with overlapping configurations can exist. The AI platform should detect potential conflicts and warn administrators during setup When high-latency connections to MCP servers are encountered, the MCP gateway 640 should implement timeouts, connection pooling, and optimization techniques to minimize impact.

The system can also accommodate community-contributed MCP servers that require updates. A version management system can notify users, provide update paths, and handle backward compatibility.

The MCP gateway 640 can be deployed as follows. An administrative user begins by registering an account. On a UI, the user can browse a catalog of available MCP servers, which can include AI-platform-created servers designed to integrate with key APIs and services. The user can select servers to integrate into their applications, with a limit (such as up to five servers) for freemium-tier users. Once selected, the user configures authentication for the chosen servers, providing credentials or linking to secure credential stores as needed. The system then provides connection details, such as gateway URLs and API keys, enabling the user to connect to the MCP servers. After deployment, the user can monitor usage and performance metrics through a dashboard, allowing visibility into transaction volume, latency, and other operational characteristics.

The administrative user can also add custom MCP packages. The UI can include an option for providing a repository URL, selecting a package type, and configuring build parameters. The UI then presents a review of the deployment, and tests the connection with the MCP server generated from the MCP package.

The admin UI can allow for creating and manage multiple MCP gateways 640. This can include assigning one or more MCP servers to a gateway 640, setting security policies and access controls, and generating unique gateway URLs. The UI also allows for monitoring usage across gateways. The administrator can manage credential flows by configuring credentials on the UI. This can include UI options for testing integration and assigning credential access to specific MCP servers.

The developer UI also can provide mechanisms for reviewing and submitting feedback for developer-created MCP servers.

Figure 7A:
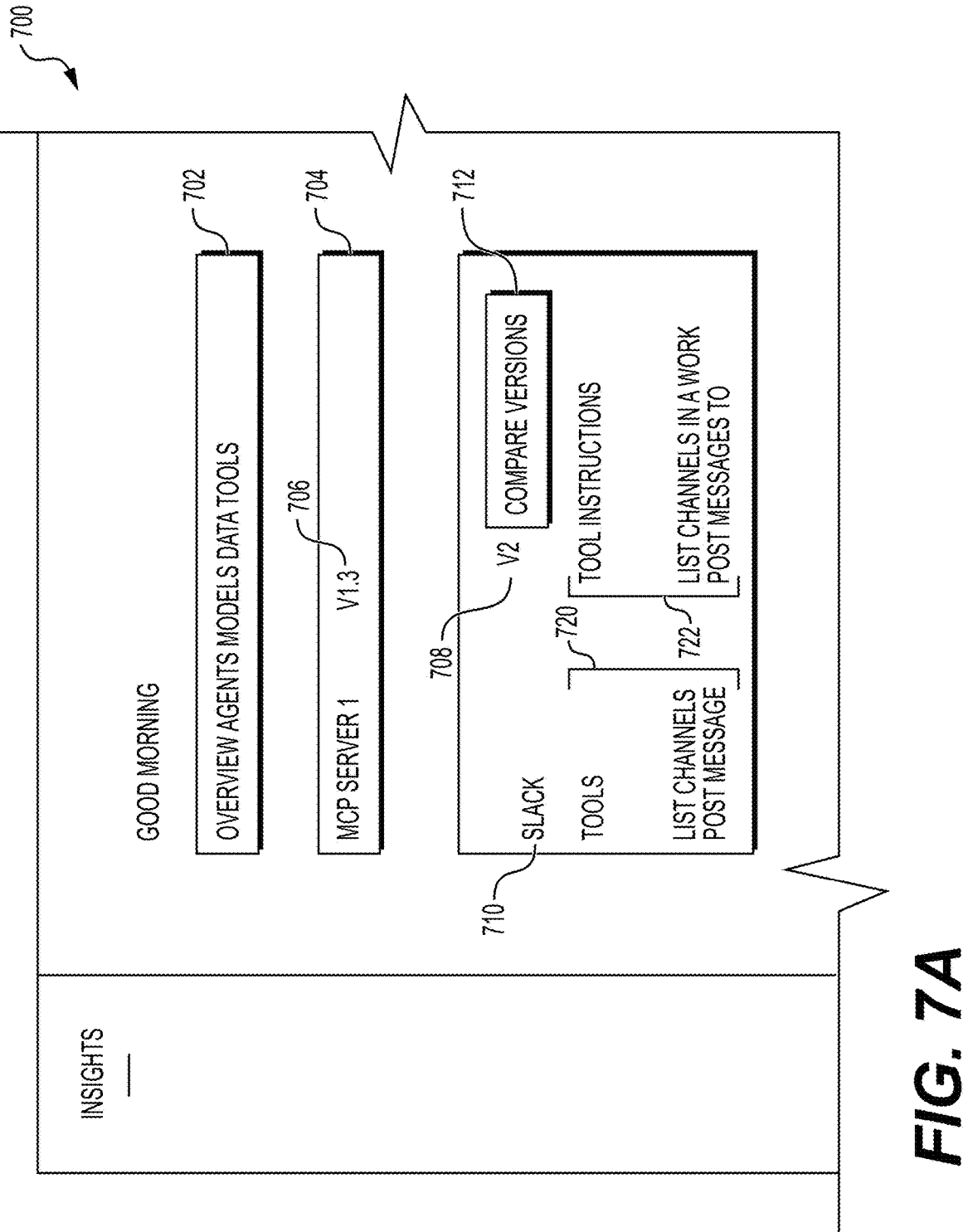
FIG. 7A is an example illustration of a user interface ("UI") screen for indicating a change in MCP tools.

FIG. 7A is an example illustration of a user interface ("UI") screen for indicating a change in MCP tools. The UI 700 is part of a management console that can be provided by the AI platform or the MCP gateway. In this example, the UI 700 includes an insights tab bar 702 for selecting to view insights related to AI agents, AI models, datasets, and tools.

Below, in a differences pane 704, an MCP server called server 1 is highlighted. The current allowed version (first version 706) is 1.3. In the next pane, a visual indicator 712 of a change relative to the MCP server is shown. The visual indicator 712 is a button to "compare versions." The tool is identified as SLACK 710. A version number 708 is also shown.

Below, the UI 700 includes a side-by-side comparison of the old tool description and instructions 720 and the new tool description and instructions 722. In some examples, the differences in text are colored to catch the user's attention.

Selecting the visual indicator 712 to compare versions can cause an additional UI screen to display. One such screen is shown in FIG. 7B.

Figure 7B:
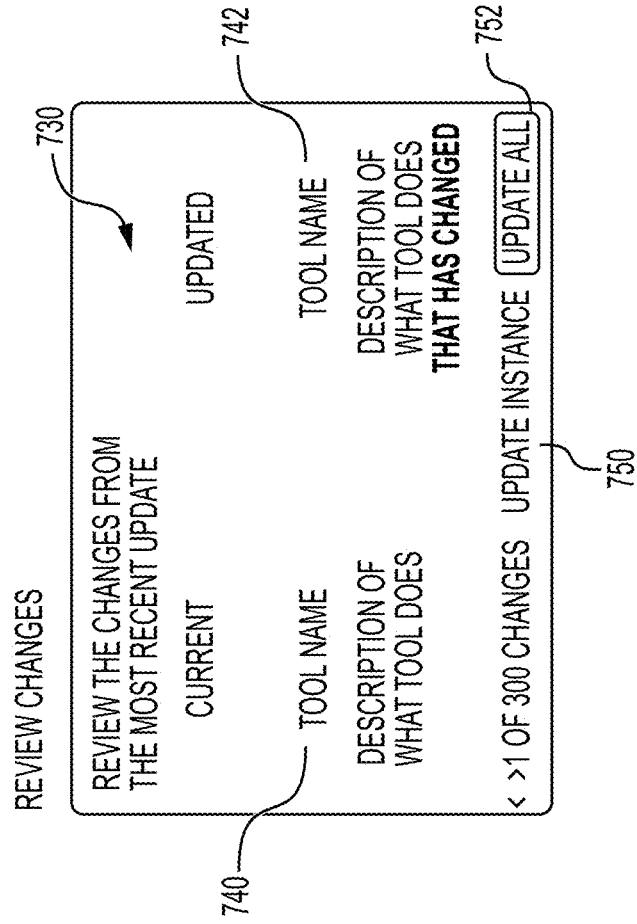
FIG. 7B is an example illustration of a UI screen for accepting or blocking a change in MCP tools.

FIG. 7B is an example illustration of a UI screen for accepting or blocking a change in MCP tools. A UI screen 730 highlights changes in the tool. The first version of the tool and its description are shown on the left side 740, whereas the second version of the tool and its description are shown on the right side 742.

The administrator is presented with a button 750 to update this instance, which updates the current MCP server where the change was detected. A second button 752, update all, will accept usage of the new tool version for all other instances where this change was detected.

Figure 8:
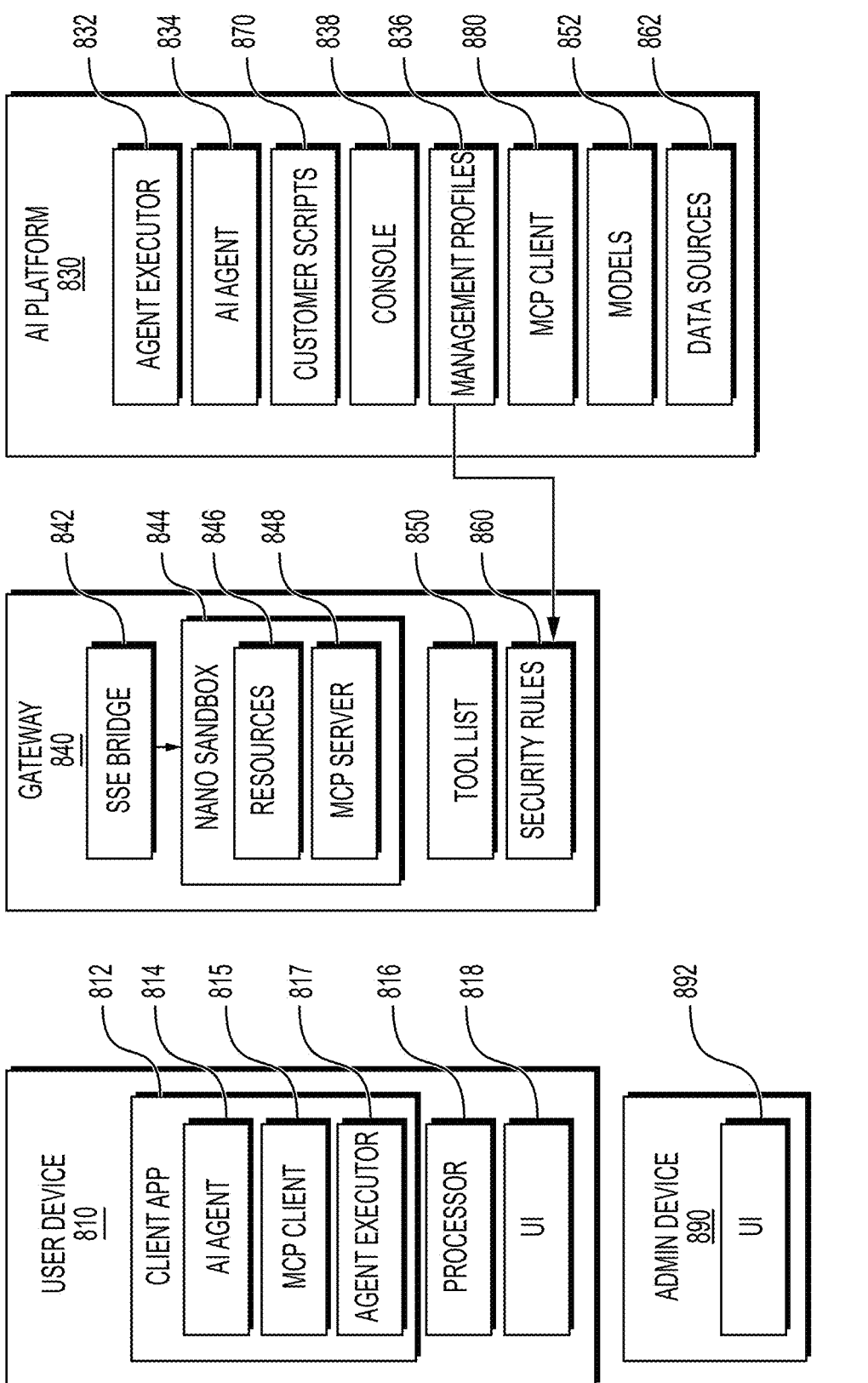
FIG. 8 is an example illustration of system components for secure MCP server access for AI Agents.

FIG. 8 is an example illustration of system components for secure MCP server access for AI Agents.

A user device 810 can execute a client application 812 that utilizes an AI agent. The user device 810 can be any processor-based device, such as a phone, tablet, laptop, or personal computer. The processor 816 can execute the client application 812. The client application 812 can execute an AI agent 814 that is used to access some or all of the AI agent. The AI agent 814 can reference an address, such as an URL, that corresponds to an agent executor 817 or 832, which can be one or more processes that execute on one or more physical servers. For example, the agent executor 832 can operate on a proxy or gateway server 840. The agent executor 832 can also operate in the cloud, or as part of an AI platform 830. The AI platform 830 can operate on one or more servers and provide a UI as part of a console 838 for allowing administrators to design the AI agent 834 (among others) and set management rules for those. The console 838 also provides a UI 892 that allows the administrator to view MCP-related changes and allow or block various tools. An administrator can connect to a console 838 using an administrator device 890, in an example. The connection can be remote, such as over the internet, and the administrator device 890 can be any processor-enabled device, such as a laptop. The management rules can be stored in management profiles 836, which the agent executor 832 (including the rules engine) can use for executing the AI agent 834.

The AI agent 834 can utilize an MCP client 815 or 880 in executing various tools, prompts, or datasets that can exist on an MCP server 848. The MCP client 815 can be one or more processes that execute and send and receive data with an MCP server. This can be facilitated with a secure intermediary, such as gateway 840 and SSE bridge 842.

The agent executor 832 can rely on a rules engine for enforcing rules on inputs from the client application 812 prior to those inputs being transmitted to a particular AI model among AI models 852. The rules engine can also dictate which data sources 862, such as vector databases, are available to the user. For example, a vector database can include access restrictions, and the user may need adequate permissions to gain access. The rules engine can comprise one or more processes that are executed on one or more physical servers.

The AI platform 830 can maintain a store of customer scripts 870, which can be any type of client code. The customer scripts 870 can be associated with code blocks that are utilized in AI agents 834. The customer scripts 870 can be in Python or in other programming languages.

MCP gateway 840 can be one or more servers and can be part of the AI platform 830 or separate. The MCP gateway can centralize MCP activity such that it can be better managed and secured. An SSE bridge 842 can execute at the MCP gateway 840, listening for requests and commands from MCP clients 815, 880. As has been described, the gateway can apply security rules 860 to inputs. For secure inputs, the SSE bridge 842 can create a nano sandbox 844 as defined in the header of an MCP client's request. The nano sandbox environment can be provisioned with various resources 846 needed for the MCP process. The SSE bridge 842 can launch the MCP process, such as an MCP server 848, within the nano sandbox 844.

The gateway 840 can request a tool list 850 from MCP servers. These lists can be stored and compared to detect differences and changes. Those can then be viewed in a console 838, which can be accessed on a UI 892 on an administrator device 890.

To execute the tools securely, the agent executor 832 can make calls to an MCP client 880, which can operate as one or more processes. An API can define different functions available to the MCP client 880. The MCP client 880 can execute at the AI platform 830 or at some other server, such gateway 840. The MCP client 880 can interact with the SSE bridge 842 to run MCP processes. The SSE bridge 842 can create simultaneous nano sandboxes 844. Each nano sandbox isolates the execution of an MCP process, such as an MCP server 848. Nano sandboxes 844 can also be created for customer scripts 870 in one example, such that the scripts cannot access information in other nano sandboxes or at the AI platform 830 or gateway 840 generally.

The MCP client 880 can dynamically create MCP environments by defining nano sandbox environments in the header of requests sent to the SSE bridge 842. This can ensure that the MCP process has the needed resources but cannot overreach outside the nano sandbox for system resources and the like.

The security rules can be applied differently to different users, who are tracked via user management profiles 836, including security rules, that are stored by a management server, gateway, and/or the AI platform. The management server can be part of AI platform 830 or separate. The management server(s) can execute the AI management service on one or more processors. The management profiles 836 can track information about users, groups, and tenants, and can include AI management profiles and AI user management profiles. The tenants can be customers or customers of customers. The groups can be divisions within those tenants, such as a developer group or an executive group.

Various management rules, including security control markers, can be associated with the different management profiles 836. For example, the management rules discussed above can be stored in management profiles 836, which are assigned to particular users, groups, and tenants.

For example, an AI management profile can be retrieved that includes a ruleset defined by multiple security control access markers for deriving a user permission level. Security control access markers can be set by an administrator and specify what to look for in the input and in contextual data received with the input. The security control access markers can delineate contextual and content characteristics that are required for the user to have a particular access permission. The derived access permission can be limited by a default access permission of the user management profile associated with the user. For example, when the user's default access permission is P2, as specified by the user management profile, then the derived access permission either cannot exceed P2 or still will not grant full P1 permissions based on the default access permission being only P2. The AI platform 830 or an outside management service can maintain user management profiles that indicate default permissions for users. The default permissions can be based on groups to which the user is associated, roles, or can explicitly map to one of multiple permissions levels. The default permission level can indicate a maximum permission level for the user. However, the derived access permission level can be based on analysis of the usage context in view of the security control markers and can fall short of the default access permission level. This can cause the user to be restricted to access of code blocks or of content at the lower derived access permission level. The rules engine can cause the user to be prompted for additional login information to bring the derived access permission level into alignment with the default.

Consequently, the derived access permission and the default access permission for a user can cause the rules engine to determine availability of code blocks, system resources used by the customer scripts, as well as content (such as various chunks and vector databases) and even language models. The rules engine can evaluate an input and contextual data in real-time. The contextual data can include contextual information about the user's network or encryption settings, user location, and device characteristics. The rules engine can receive the usage context (contextual data) in association with the input. The input and contextual data can be compared against security control markers as part of deriving the access permission for the user.

The AI management profile can include the security control markers. The security control markers can be set by an administrator using a UI at the AI platform (e.g., the AI management service). The security control markers can include device-related compliance rules that relate to user location, user work hours, application usage characteristics, application settings requirements, authentication requirements, network requirements, and the like. The derived access credential can be an access score, and the access score can map over to established permissions levels such as P1, P2, and P3.

In one example, the security control markers can be enforced by a management controller or the rules engine to create the access score. The management controller can execute at the user device to track and report user activity and other contextual data. The access score can be compared against multiple thresholds that map to different access privileges. For example, to access highly confidential documents, the access score may need to be higher than for accessing confidential documents. To access documents with special sensitivity levels, different access scores may be required. The access score can also be calculated fully or in part by the rules engine at the gateway. For example, the management controller can report context related to the security control markers, which are then analyzed at the gateway or by a different service utilized by the gateway.

The AI management profile can be one or more files received by the rules engine from an AI management service, which can operate locally or remotely to the rules engine. The rules engine can compare the security control markers to the usage context as part of deriving the access permission level. Additionally, a user management profile can specify a default permission level for the user, and the derived access permission level can be relative to the default. In instances in which the derived access permission level is less than the default permission level, the rules engine can notify the client application so that the user can take corrective actions.

The management service can include a UI 818, which can be code that gets rendered on a screen by the user device 810. The management service can also include rule enforcement logs. These logs can track the various inputs, outputs, rules implicated, and remedial actions taken.

Other MCP processes are also usable with the above system and methods. For example, sampling is a powerful MCP feature that allows servers to request LLM completions through the client, enabling sophisticated agentic behaviors while maintaining security and privacy. The sampling flow can follow these steps: the server sends a sampling/createMessage request to the client, the client reviews the request and can modify it, the client samples from an LLM, the client reviews the completion, and the client returns the result to the server. This human-in-the-loop design ensures users maintain control over what the LLM sees and generates.

Sampling requests include messages (conversation history to send to the LLM), model preferences (hints about suitable models), system prompt (optional specific system instructions), context inclusion (what MCP context to include), and sampling parameters (controls for the generation).

Roots are another concept in MCP that define the boundaries where servers can operate. They provide a way for clients to inform servers about relevant resources and their locations. A root is a URI that a client suggests a server should focus on. When a client connects to a server, it declares which roots the server should work with. While primarily used for filesystem paths, roots can be any valid URI including HTTP URLs. For example, roots could be file:///home/user/projects/app/or https://api.example.com/v1/.

Roots serve several important purposes. They provide guidance by informing servers about relevant resources and locations. They add clarity by making it clear which resources are part of your workspace. They facilitate organization by allowing multiple roots that let you work with different resources simultaneously.

Figure 9:
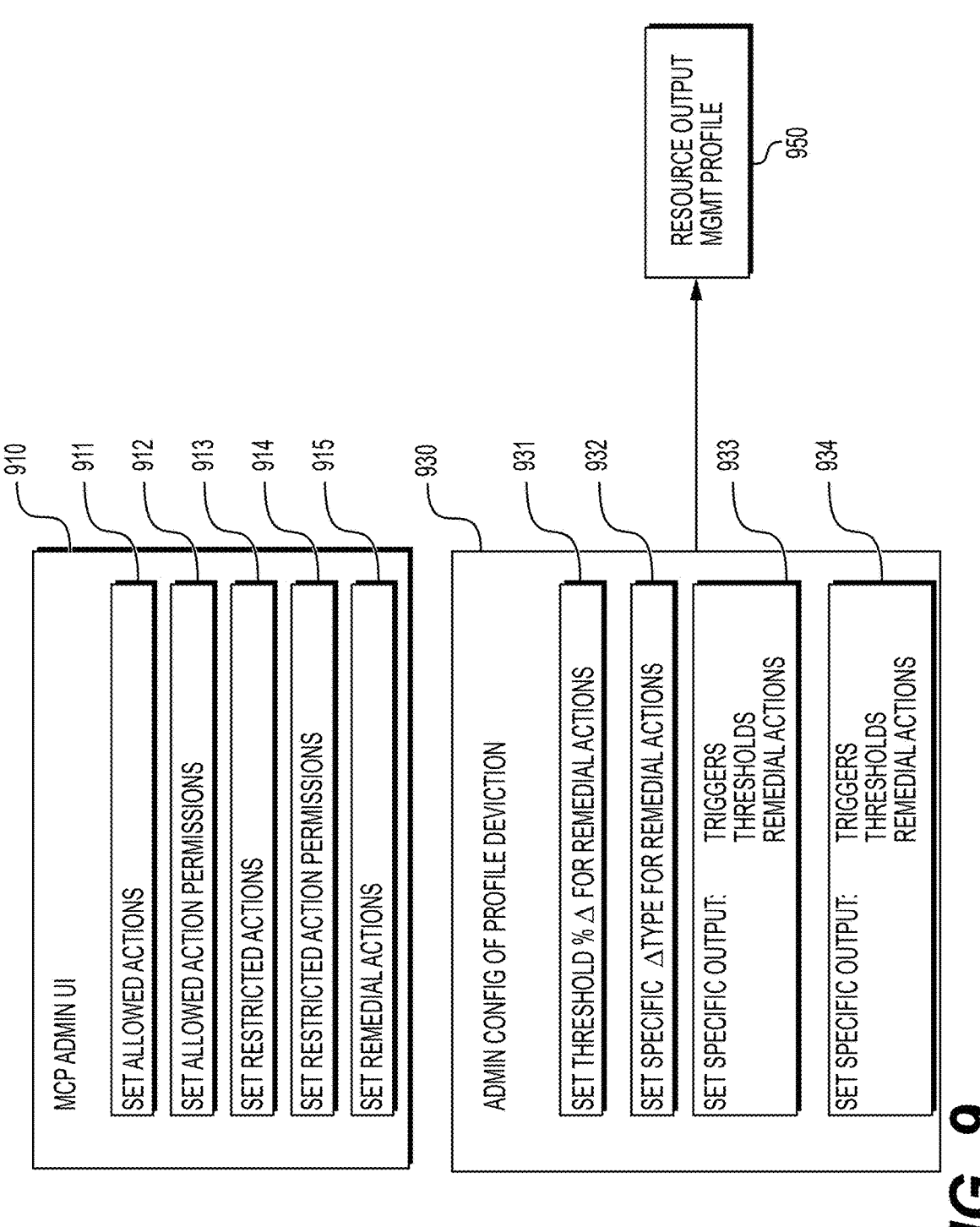
FIG. 9 is an example illustration of UI screens for administrative settings of allowed, restricted, and remedial actions for detected changes in MCP resources.
Figure 10:
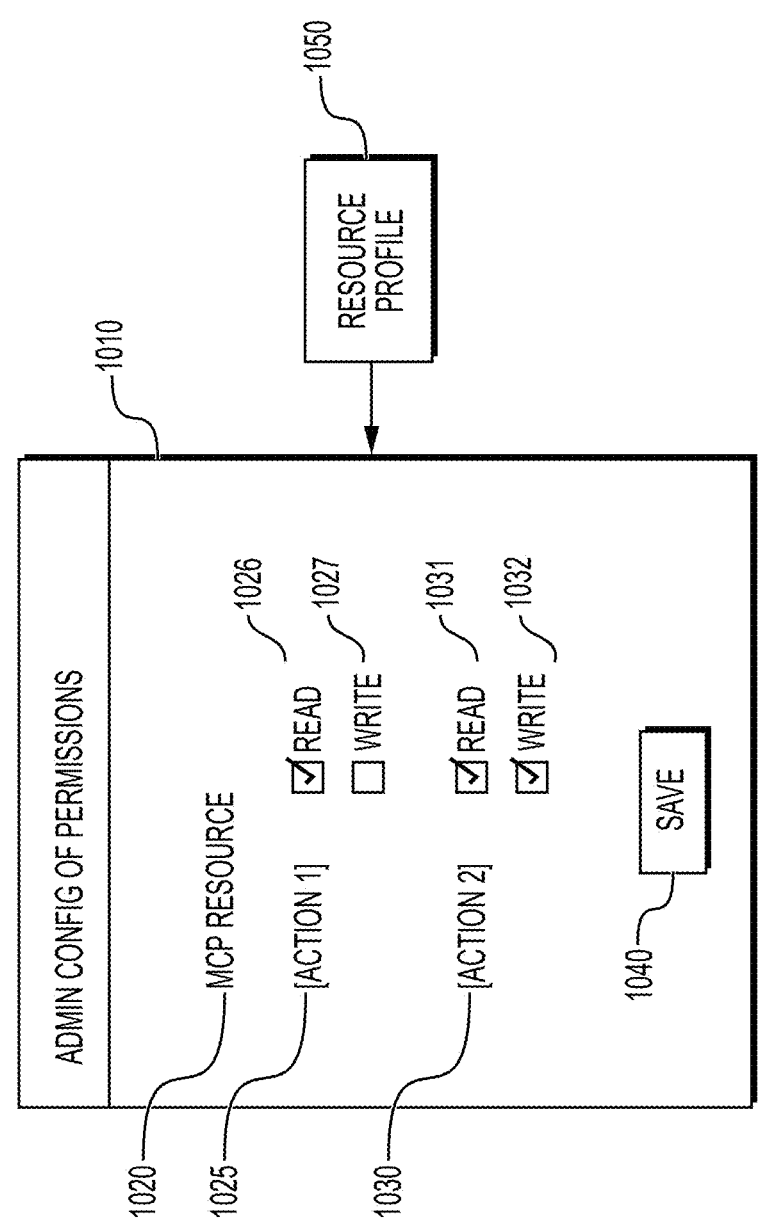
FIG. 10 is an example illustration of a UI screen for setting permissions associated with actions of an MCP resource.
Figure 11:
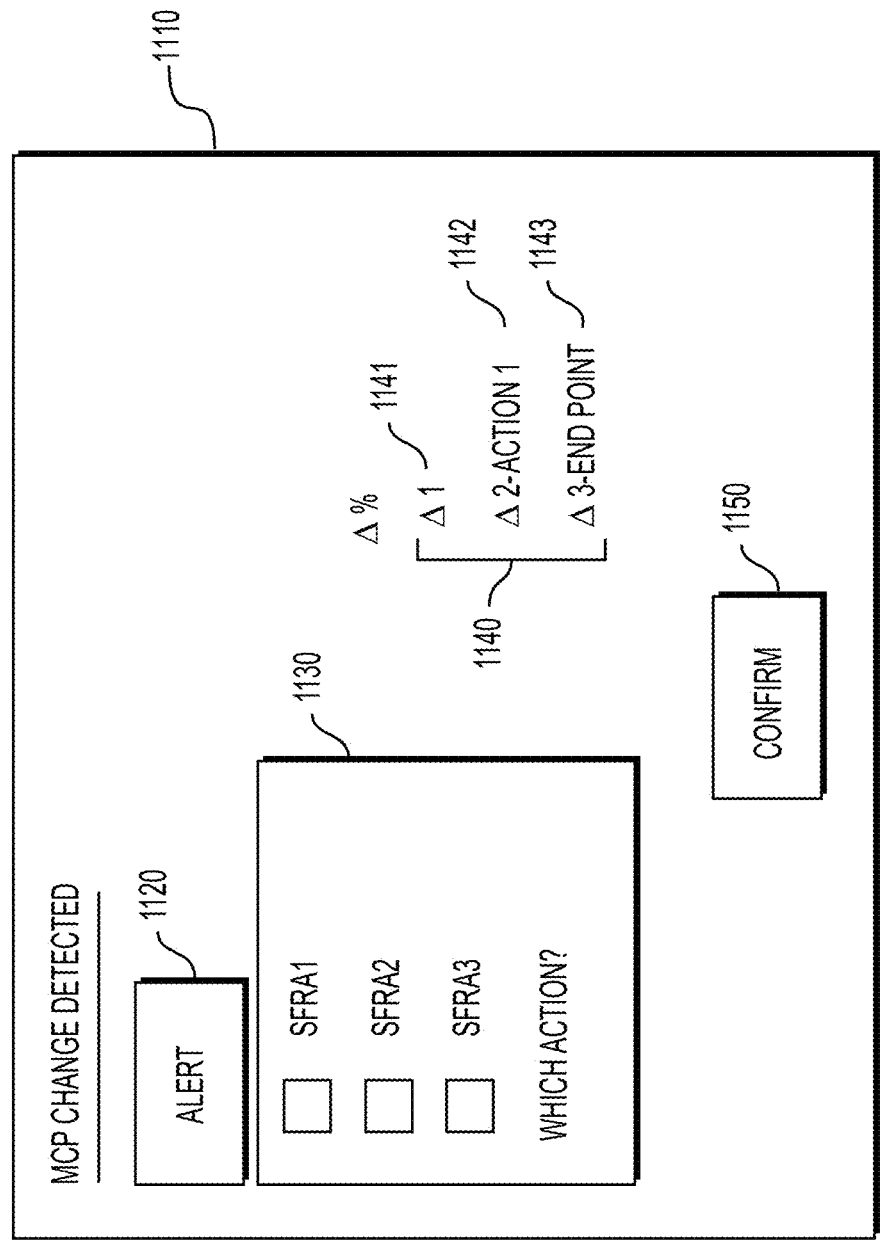
FIG. 11 is an example illustration of a UI screen presented when a change is detected.

FIGS. 9, 10, and 11 illustrate example UI screens for setting management profiles associated with MCP changes and corresponding remedial actions. FIG. 9 is an example illustration of UI screens 910, 930 for administrative settings of allowed, restricted, and remedial actions for detected changes in MCP resources. The UI can be available as part of the AI platform, allowing an administrative user to define which actions and permissions are allowed or restricted for an MCP resource. This can give an administrator granular control to set up the system to make automated decisions when encountering changes in MCP profiles. No prior solutions allow for controlling triggered remedial actions in response to automatically detected MCP server changes. This solution can allow organizations to more safely incorporate MCP server resources (e.g., tools and datasets) into their AI agents. The administrative UI gives an administrator a mechanism to guide the actions of the automated AI agents in the event that changes in the MCP resources are detected. The UI allows for setting the conditions for which any of the remail actions discussed herein can be automatically triggered and performed.

UI screen 910 is an initial UI screen with options for setting which resource actions are allowed, which environment permissions are granted for those actions, and which remedial actions the system will implement. Allowed actions can be stored in a whitelist, whereas restricted actions can be stored in a blacklist. The permissions can define which system permissions are granted to the various allowed and restricted actions.

A resource action can comprise a resource command. For example, a single resource can include multiple available commands defined in the resource profile. Each of these resource commands can be an action displayed on the administrative UI 910.

The UI 910 can include a button 911 for setting allowed actions. This can allow the administrator to select which actions to whitelist with regard to the resource. Actions can be whitelisted in a resource-specific whitelist or a global whitelist. Different resources can have similar actions, and therefore a global whitelist can allow the administrator to define which types of actions are always allowed.

Button 912 can allow the administrator to set permissions for each action in the whitelist. Basic permissions can include read and write permissions. The read and write permissions can dictate whether the action is allowed to make changes to files (write permission) or merely read the contents (read permission). If neither permission is granted, then the action can be blocked, in an example. More granular permissions are also possible.

Button 913 can allow the administrator to set restricted actions, adding those actions to a blacklist. Again, the UI can display a full list of actions that are available according to a resource specification (i.e., resource profile). These can include resource commands that relate to the resource. The administrator can set one or more of those actions as restricted. Then, with button 914, the administrator can set permissions for the various restricted actions. This can either indicate which permissions are disallowed or can be used to indicate which permissions are still allowable for a restricted action.

Button 915 can allow an administrator to set remedial actions. In one example, the UI allows for selecting which remedial actions are available for assignment within the system. For example, the administrator can limit the universe of available remedial actions such that platform users must select from within that subset of remedial actions for assigning to different change thresholds or specific changes detected in the MCP specifications. The remedial actions can be assigned to specific allowed or restricted actions that can be present in a current or future resource profile. Alternatively, the remedial actions can be assigned to various changes thresholds Another UI screen 930 can provide options for setting change thresholds and specific changes that can be assigned remedial actions. Defining these two types of detected events allows for setting specific criteria for the settings created using UI 910—such as, the definition of the allowed actions, restricted actions, associated permissions, and remedial actions.

Button 931 allows for defining one or more change thresholds. A change threshold can be a numeric value or threat category that indicates a materiality of the change to the resource specification. An AI model can score the change based on the type of change and the difference of downstream operation. For example, a new resource command signature, indicating a new command, can be weighted more highly than a new description for an existing resource command, particularly when that new description indicates a semantically same or similar operation to the prior description. However, if the new description indicates a different semantic operation (such as forwarding data to a different destination), that can be weighted heavily in scoring the change.

An administrator can use the UI to set different remedial actions for different change thresholds. Button 931 can allow the administrator to specify the different change thresholds for a resource and even assign different remedial actions to those different thresholds.

By contrast, button 932 can allow the administrator to specify specific changes or change types that can result in remedial actions. Example specific changes that the UI allows the administrator to select include a detection of a new command signature, detection of a new outside endpoint, detection of a request for additional user information, and detection of a new request to access system resources. These types of changes can be assigned remedial actions, such that no analysis of the change percentage is required. Alternatively, the UI can allow the administrator to adjust the relative weights of these change types for purpose of scoring the change and comparing against the change thresholds set through selection of button 931.

With button 933, the UI can also allow the administrative user to set specific inputs or outputs to trigger remedial actions or influence the change threshold in triggering remedial actions. This option can define which inputs or outputs to or from the MCP server the SSE bridge or other process should recognize. The administrator can define triggers or weights towards a threshold in association with these specific inputs and outputs. The UI also allows the administrator to define which remedial actions take place when a trigger or threshold is met.

Button 934 provides similar functionality based on semantic detection of prohibited types of inputs or outputs. In one example, an AI model semantically monitors inputs to and outputs of the MCP server for various disallowed content. Detection or exceeding a threshold can trigger remedial actions. This can, for example, help detect prompt injection, code injection, toxic or offensive content, personally identifiable information ("PII"), hallucination detection, security threats, proprietary content, and output length violations. The administrator can set which remedial actions apply to these types of detections.

Once the administrator has made the selections on UI screens 910 and 930, the AI platform can create a resource output management profile. The resource output management profile can be utilized by the AI model or SSE bridge to screen for triggering inputs to and outputs from the MCP server.

FIG. 10 is an example illustration of a UI screen 1010 for setting permissions associated with actions of an MCP resource 1020. The MCP resource 1020 can be defined by one or more resource profiles 1050.

A resource profile 1050 refers to a data structure or descriptor that defines the capabilities, constraints, access methods, and semantic descriptions of a tool or command made available by an MCP server. Each resource profile is associated with a specific resource—such as a software tool, executable command, API endpoint, or processing unit—and provides metadata and control parameters that enable AI systems, human users, or orchestration engines to make intelligent decisions regarding when and how to invoke such resources.

In some implementations, resource profiles may be stored in a registry accessible to AI agents or orchestration systems (e.g., the AI platform), enabling dynamic discovery and contextual utilization of tools based on system state, user intent, or semantic reasoning.

A resource profile 1050 may include various types of metadata and descriptors that define the characteristics, constraints, and semantics of a tool or command accessible via the MCP server. Each resource profile may contain a unique identifier, such as a URI, UUID, or human-readable name, that distinguishes the resource within the system. The resource profile 1050 may specify the tool or resource command being exposed, including its invocation mechanism, such as a command-line string, API endpoint, or reference to an executable container or function. In some examples, the resource profile 1050 includes a natural language or structured usage description that conveys the function and intended use cases of the resource. This description may be formatted in a machine-readable manner, allowing AI models to evaluate whether a particular tool or resource command is appropriate to execute in a given context.

In addition to the usage description, the resource profile 1050 may define the expected input and output schemas associated with the tool, including parameter names, data types, whether parameters are required or optional, and example input-output pairs. Constraints may also be included, such as rate limits, authentication or access control requirements, environmental or hardware dependencies (e.g., GPU availability or operating system compatibility), and any applicable licensing or usage restrictions. The resource profile 1050 may include semantic tags or vector embeddings representing the tool's function or domain, which can support AI-driven selection based on natural language prompts or inferred intent.

Furthermore, the resource profile 1050 may include scoring or weighting metrics indicating the relative preference of the tool when multiple tools are available for a similar task. It may also contain execution context metadata, including runtime environment details, expected latency or runtime estimates, and any known side effects of execution (such as modifying external data or interacting with other systems). Observability and monitoring data may be included, such as links or endpoints for telemetry, logging, or audit trails. Versioning metadata can also be specified within the profile, including version numbers, deprecation notices, compatibility notes, and validity timeframes. Finally, a resource profile may include references to external documentation, human-readable descriptions, or UI elements that aid in understanding or managing the resource, either by users or system administrators.

The AI platform can read the resource profile 1050 and populate the UI screen 1010 with a name 1020 of the resource, and various resource commands associated with the resource. The resource commands are represented as actions 1025 and 1030 in FIG. 10. For each such action 1025, 1030, corresponding permissions 1026, 1027 can be shown on the UI screen 1010. In this example, Action 1 has a corresponding read permission 1026 and write permission 1027. The administrator can select which permissions will be available for the resource command 1025. In this example, Action 1 has read permission 1026, indicated by the checkmark, but does not have write access 1027, because the corresponding box is unchecked. Conversely, Action 2 is grated both read and write permissions 1031, 1032.

The administrator can click through various resources and select permissions for the corresponding resource actions. To apply the changes, the administrator can select a save button 1040. Applying the changes updates the resource output management profile 950 of FIG. 9. Again, this profile 950 can be a data structure that allows the SSE bridge or other processes inside or outside of the nano sandbox to make determinations of which actions and changes are allowed, which remedial actions to invoke, and when to invoke those remedial actions (e.g., based on a score compared to a threshold).

FIG. 11 is an example illustration of a UI screen 1110 showing an alert 1120 when a change is detected. A visual alert is one type of remedial action. When a change is detected that is assigned to an alert (e.g., not whitelisted), the administrator can be presented with a visual indicator of the change. One example was previously discussed regarding FIG. 7A. FIG. 11 shows another such example, with an alert 1120 that can display next to a name or other identifier of the resource. Selecting the alert 1120 can cause the UI screen 1110 to provide additional information.

In this example, selecting the alert 1120 causes the UI screen 1110 to show multiple suggested functional remedial actions ("SFRAs") 1130. The SFRAs 1130 can include the remedial actions selected by the administrator with button 915 of FIG. 9. The SFRAs can be those that are available for the particular change or resource command associated with the change. Check boxes by the SFRAs 1130 can indicate which SFRAs 1130 the administrator would like to enact in response to the alert. Likewise, the UI screen 1110 can indicate which remedial actions have already been performed, such as any remedial actions that were automatically triggered based on thresholds or specific events defined earlier by the administrator using UI screens 910, 930, 1010.

The UI screen 1110 can also display threshold actions 1140 associated with the alert 1120. Multiple different thresholds can be displayed, represented in this example by change threshold one 1141, change threshold two 1142, and change threshold three 1143. The UI screen 1110 can show the administrator which remedial actions are triggered based on the different change thresholds 1141, 1142, 1143. In this example, the first change threshold 1141 is not associated with any remedial actions except potentially the alert 1120 itself. However, the second change threshold 1142 automatically triggers Action 1, and the third change threshold 1143 automatically triggers blocking an endpoint completely. The system can detect the difference in the resource profile and generate a deviation score by an AI model. The deviation score is compared against multiple remedial action thresholds, such as those of FIG. 10, to determine the remedial action.

In one example, the administrator can utilize the UI screen 1110 to change these associated remedial actions for future automatic triggering. A confirm button 1150 allows the administrator to commit any changes to the SFRAs 1130 or the threshold-related remedial actions.

The remedial action can include displaying different options on the UI screen 1110. These can be displayed in addition to the visual indicator (e.g., alert 1120) that a change exists for a first resource profile. As shown in FIGS. 7A and 7B the UI can display multiple tools described by the changed resource profile, including activation toggles for each of the multiple tools. The UI can include a side-by-side comparison of a current version of the tool and an updated version of the tool, wherein the change is shown in the side-by-side comparison. This can include display, on the UI, of an option for activating the updated version. The change can be highlighted with respect to an instruction for the tool. The instruction can be information intended for an AI model as a system prompt to instruct the AI model on when to invoke the tool.

Additionally, approving the second version of the MCP server can cause SSE bridge operation to change. For example, the SSE bridge can create a nano sandbox for execution of the second version of the MCP server. In another example, based on receiving a UI selection that approves the change, the SSE bridge can instantiate a second MCP server. The second MCP server executes in a nano sandbox and can receive resource commands. Even though the second MCP server executes in the nano sandbox, the nano sandbox can define network privileges and contain the requisite credentials that allow the second MCP server to access an updated tool at a location outside of the nano sandbox, such as in the cloud.

The remedial actions can also be automatically triggered and performed without any further administrative input. In some cases, these cause automatic changes to operation of the SSE bridge, nano sandbox, or the MCP server. The SSE bridge can automatically perform a remedial action based on the detected difference in the resource profile. The remedial action can impact how the SSE bridge determines whether to transmit a first resource command. The SSE bridge can receive a first resource command from an MCP client. In one example, the remedial action prevents the SSE bridge or MCP server from transmitting the first resource command to a first resource. For example, the remedial action can prevent the SSE bridge from transmitting the first resource command to the second version of the MCP server. Instead, the SSE bridge is permitted to transmit the first resource command to the first version of the MCP server, which can execute in a nano sandbox. The SSE bridge can instantiate a first nano sandbox for execution of the first version of the MCP server and forward the first resource command to the nano sandbox.

After receiving administrative approval of the second version of the MCP server through selections on the UI, the SSE bridge can proceed in the future by instantiating a second nano sandbox for execution of the second version of the MCP server. The SSE bridge forwards a second resource command to the second nano sandbox. In another example, the SSE bridge transmits the first resource command to the second version of the MCP server in an instance in which the difference is identified in a whitelist of trusted resources or updates.

The remedial action can also limit the system resources provided within the nano sandbox. For example, the system files, user files, credentials, permissions, network access, and the like can all be set for the nano sandbox environment according to the remedial action. This can prevent a new or changed resource command from accessing a full scope of system or network resources.

The changed resource can be reflected in a second resource profile that identifies a new command signature. The remedial action can cause the SSE bridge to block the first resource command in an instance in which the first resource command references the new command signature.

The remedial action can comprise blocking the first resource command in an instance in which the MCP server is remotely accessed by the SSE bridge through SSE streaming. This can prevent unexpected requests from the remotely accessed MCP server, or security issues involved in sending sensitive data to the remote location.

The remedial action can update security rules used by the SSE bridge. The SSE bridge, for example, can validate that the first resource command complies with security rules and only transmit compliant resource commands to the MCP server. Likewise, the SSE bridge can validate that the result received from the MCP server also complies with the security rules before transmitting it to the MCP client. Likewise, detecting the difference in resource profiles can comprise evaluating the second resource profile based on security rules for data loss prevention.

The remedial action can be triggered based on comparing the difference against a blacklist of disallowed changes and/or a whitelist of approved changes. In some cases, the remedial action comprises terminating execution of the MCP server and deleting a nano sandbox in which the MCP server executed.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for securely executing artificial intelligence ("AI") agents by tracking changes to model context protocol ("MCP") processes, comprising:

transmitting, by a server-sent event ("SSE") bridge to an MCP server, a request to receive available resources at the MCP server;

receiving a first list of resource profiles, comprising a resource identifier, from the MCP server, the first list comprising the resource profiles available for a first version of the MCP server at a first time;

storing the first list, wherein a subset of the resource identifiers or resource profiles available at the first version of the MCP server have administrative approval for access;

receiving a second list of resource profiles available from the MCP server, the second list comprising resource profiles available for a second version of the MCP server at a second time;

detecting a difference between the first list and the second list, wherein the difference applies to the subset with administrative approval; and performing a remedial action based on the difference, comprising causing display, on a user interface ("UI"), of a visual indicator that a change exists for a first resource profile, the first resource profile having pre-existing administrative approval.

2. The method of claim 1, wherein the UI displays multiple tools described by the resource profiles of the first list, and wherein the UI comprises activation toggles for each of the multiple tools.

3. The method of claim 1, wherein the visual indicator indicates that an update is available for a tool described by the first resource profile.

4. The method of claim 3, wherein selecting the tool causes the UI to display a side-by-side comparison of a current version of the tool and an updated version of the tool, wherein the change is shown in the side-by-side comparison.

5. The method of claim 4, further comprising causing display, on the UI, of an option for activating the updated version.

6. The method of claim 4, wherein the change is with respect to an instruction for the tool.

7. The method of claim 6, wherein the instruction is sent to an AI model as a system prompt to instruct the AI model on when to invoke the tool.

8. The method of claim 1, further comprising:

receiving a selection that approves the second version of the MCP server; and causing a nano sandbox to be created for execution of the second version of the MCP server.

9. The method of claim 1, further comprising:

in an instance in which the change exceeds a threshold deviation score, sending an alert to an administrative user.

10. The method of claim 1, wherein detecting the difference comprises generating a deviation score by an AI model, wherein the deviation score is compared against multiple remedial action thresholds to determine the remedial action.

11. The method of claim 10, further comprising:

causing display, on the UI, of selectable remedial actions that are performed based on each of the multiple remedial action thresholds.

12. The method of claim 1, further comprising:

based on receiving a UI selection that approves the change, causing instantiation of a second MCP server, wherein the second MCP server executes in a nano sandbox, and wherein the SSE bridge sends a resource command to the second MCP server, causing the second MCP server to access an updated tool at a location outside of the nano sandbox.

13. The method of claim 1, wherein detecting the difference comprises comparing a first checksum of the first list to a second checksum of the second list.

14. The method of claim 1, wherein detecting the difference comprises evaluating a changed resource profile based on security rules for data loss prevention.

15. The method of claim 14, wherein the security rules comprise a whitelist of permissible resource profiles against which the second list is compared, wherein a matching whitelisted resource profile does not trigger detection of the difference.

16. The method of claim 14, wherein the security rules comprise a blacklist of impermissible deviations against which the second list of resource profiles is compared, wherein the existence of a blacklisted impermissible deviations triggers detection of the difference.

17. The method of claim 1, wherein detecting the difference between the first list and the second list comprises identifying a new tool signature in the second list that does not exist in the first list.

18. The method of claim 1, wherein the second list is received based on subscribing to change events of the MCP server.

19. A non-transitory, computer-readable medium containing instructions for securely executing artificial intelligence ("AI") agents by tracking changes to model context protocol ("MCP") tools, wherein the instructions are executed by at least one processor to perform stages comprising:

transmitting, by a server-sent event ("SSE") bridge to an MCP server, a request to receive available resources at the MCP server;

receiving a first list of resource profiles, comprising a resource identifier, from the MCP server, the first list comprising the resource profiles available for a first version of the MCP server at a first time;

storing the first list in a data storage, wherein a subset of the resource identifiers or resource profiles available at the first version of the MCP server have administrative approval for access;

receiving a second list of resource profiles available from the MCP server, the second list comprising resource profiles available for a second version of the MCP server at a second time;

detecting a difference between the first list and the second list, wherein the difference applies to the subset with administrative approval; and performing a remedial action based on the difference, comprising causing display, on a user interface ("UI"), of a visual indicator that a change exists for a first resource profile, the first resource profile having pre-existing administrative approval.

20. A system for securely executing artificial intelligence ("AI") agents by tracking changes to model context protocol ("MCP") tools, the system comprising:

at least one physical non-transitory, computer-readable medium comprising instructions; and at least one processor that executes the instructions to perform stages comprising:

transmitting, by a server-sent event ("SSE") bridge to an MCP server, a request to receive available resources at the MCP server;

receiving a first list of resource profiles, comprising a resource identifier, from the MCP server, the first list comprising the resource profiles available for a first version of the MCP server at a first time;

storing the first list in a data storage, wherein a subset of the resource identifiers or resource profiles available at the first version of the MCP server have administrative approval for access;

receiving a second list of resource profiles available from the MCP server, the second list comprising resource profiles available for a second version of the MCP server at a second time;

detecting a difference between the first list and the second list, wherein the difference applies to the subset with administrative approval; and performing a remedial action based on the difference, comprising causing display, on a user interface ("UI"), of a visual indicator that a change exists for a first resource profile, the first resource profile having pre-existing administrative approval.

\* \* \* \* \*